United States Patent

[11] 3,623,735

[72] Inventors Chester M. Fackler; Fred W. Johnson; Bruno F. Wehmer, all of Lexington, Ky.

[21] Appl. No. 699,259

[22] Filed Jan. 19, 1968

[45] Patented Nov. 30, 1971

[73] Assignee International Business Machines Corporation Armonk, N.Y.

[54] DICTATING AND TRANSCRIBING APPARATUS WITH AUTOMATIC AND SEMIAUTOMATIC OPERATOR-CONTROLLED FACILITIES
16 Claims, 49 Drawing Figs.

[52] U.S. Cl. ........ 274/4 J

[51] Int. Cl. ........ G11b 27/10

[50] Field of Search ........ 274/4.2, 17, 21, 22; 179/100.1 DR, 100.25, 100.2 T

[56] References Cited

UNITED STATES PATENTS

| | | | |
|---|---|---|---|
| 2,974,960 | 3/1961 | Hyatt | 274/4 (.2) |
| 2,990,184 | 6/1961 | Stanton | 274/4 (.2) X |
| 3,409,746 | 11/1968 | Skov | 274/4 (.1) X |
| 2,652,259 | 9/1953 | Keller | 274/17 |
| 2,864,895 | 12/1958 | Bryant | 179/100.1 (DR) |
| 3,056,606 | 10/1962 | Schueler | 179/100.1 (DR) |
| 3,243,189 | 3/1966 | Proctor | 274/17 |
| 3,365,200 | 1/1968 | Dollenmayer | 274/17 |

OTHER REFERENCES

IBM Technical Disclosure Bulletin, Vol. 8, No. 1, June, 1965, pp. 45, 46

*Primary Examiner*—Leonard Forman
*Assistant Examiner*—Dennis A. Dearing
*Attorneys*—Hanifin and Jancin and D. Kendall Cooper

ABSTRACT: The invention concerns dictating and transcribing apparatus using a magnetic belt record media and having a variety of automatic and semiautomatic features. The dictating and transcribing units are arranged for loading and unloading of a magnetic belt and have an automatic phasing feature for establishing initial synchronism of the driving lead screw and the belt for accurate tracking of a signal transducer in relation to the belt during recording and transcribing operations Certain procedures are provided to insure compatibility of the units with different kinds of record media.

INVENTORS

CHESTER M. FACKLER
FRED W. JOHNSON
BRUNO F. WEHMER

BY D. Kendall Cooper
ATTORNEY

DICTATING AND TRANSCRIBING APPARATUS WITH AUTOMATIC AND SEMIAUTOMATIC OPERATOR-CONTROLLED FACILITIES

CROSS REFERENCES TO RELATED PATENTS AND APPLICATIONS

U.S. Pat. No. 3,203,000, W. L. Dollenmayer, inventor; entitled "Marking Device for Dictating Machine".

U.S. Pat. No. 3,222,460, N. J. Albanes, et al., inventors; entitled "Multiple Station Selection System".

U.S. Application Ser. No. 699,246, filed concurrently herewith; inventors: J. Cater, et al.; entitled "Dictating and Transcribing Apparatus with Rapid Transducer Alignment and Movement Facilities".

U.S. Application Ser. No. 699,253, filed concurrently herewith; inventors: C. L. Ridings, et al.; entitled "Transcribing Apparatus with Variable Automatic Recall Facilities".

U.S. Pat. No. 3,532,837, issued Oct. 6, 1970; inventors: J. Richard Dyar, et al.; entitled "Headset Featuring Collapsibility for Storage and Expandibility for Use".

OTHER REFERENCES

The following additional references are of interest:

IBM Technical Disclosure Bulletin, June 1963, Pp. 22 and 23, authored by B. F. Wehmer, entitled "Backspacer for Portable Dictator".

IBM Technical Disclosure Bulletin, May, 1967, Pp. 1776 and 1777, authored by W. F. Wing, entitled "Retractable Cord Take-up Reel with Auto-Reset Cord Stop".

Customer Engineering Instruction Manual, Dictation Equipment, IBM Models 211, 212, and 213, form No. 241-5071, dated Oct. 5, 1962.

Reference Manual, Dictation Equipment, IBM Models 211, 212, 213, and 214, form No. 241-5132, dated Oct. 22, 1962.

BRIEF BACKGROUND OF INVENTION, INCLUDING FIELD AND PRIOR ART GENERAL

The field of the invention encompasses dictating and transcribing apparatus, particularly those having provision for recording and reproducing sound on a magnetic record media, such as a magnetic belt. Devices of this nature generally have means for operator control of the equipment. Thus, a dictating unit generally has an associated microphone with control buttons and a transcribing unit generally has a head set and a foot control. In addition, assorted warning devices, both audio and visual are provided. Prior art of interest is indicated in the several sections below.

The Albanes, et al., patent noted in the Cross References section describes a magnetic belt dictating machine that is also representative of a prior art device of this nature. Comparable apparatus is also described in the Customer Engineering Instruction Manual and Reference Manual listed in the "Other References" section above.

MACHINE CONTROLS AND CIRCUITS

Considering the dictating unit, the operator controls permit the establishment of a Record and a Listen mode of operation, together with forward spacing and backspacing in order to review previously dictated material. The transcribing unit generally operates in a Listen mode but also has provision for reviewing various portions of a previously dictated belt. Provision is made in the dictating unit for a Dictating mode, a Conference mode, and a Telephone mode, when required. Representative prior art in this area, includes Dunning 2,305,681 that shows a phonograph system having Microphone, Conference, and Telephone inputs, with selection of inputs. Yerkovich 2,318,828 describes a belt dictation apparatus with provision for recording and reproducing information and also providing signals to indicate various conditions of the apparatus.

BELT LOADING AND UNLOADING, PHASING, HEAD RESTORING, AND RELATED CIRCUITS AND MECHANISMS

The apparatus described herein features a significantly efficient belt loading and unloading action together with a phasing operation activated during belt loading to establish an initial starting point on the magnetic belt in order to insure accurate transducer tracking from machine to machine. The apparatus also provides for restoring the transducer when the magnetic belt is unloaded from the machine. A number of prior art devices have had semiautomatic belt loading or unloading but not in connection with phasing control. The Yerkovich Pat. Nos. 2,318,828; 2,371,116; and 2,409,006 are representative of belt loading and unloading mechanisms in the prior art. The Dann Pat. No. 2,268,645 describes a phonograph with mechanism for returning a stylus automatically as an incident to removing a record from the machine. A number of prior art devices have provision for establishing phasing or synchronism between the transducer head and the track on the belt for each and every cycle of revolution of the belt in contrast with the present mechanism which establishes phasing initially and then depends upon the accuracy of the driving mechanisms to maintain the phasing for the rest of the belt. The Albanes patent, noted in the "Cross Reference" section above describes a dictating machine with manual loading and unloading of the belt.

SUMMARY

The invention concerns dictating and transcribing apparatus with increased efficiency of operation and improved compatibility. The equipment makes use of magnetic belt recording media and has provision for semiautomatic belt loading and unloading and initial phasing to insure proper transducer tracking. The same basic belt handling mechanism is used in the dictating unit and the transcribing unit.

OBJECTS

Accordingly, an object of the invention is to provide dictating and transcribing apparatus having inherent efficiency and compatibility.

Another object of the invention is to provide dictating and transcribing apparatus with greater flexibility of operation while maintaining effective operator control.

Still another object of the present invention is to provide for semiautomatic belt loading and unloading with initiation of either operation performed by the operator of the equipment.

A further object of the invention is to provide for initial phasing of a magnetic record media in order to insure proper tracking of the transducer in relation to the media.

Still another object of the present invention is to provide for sound head restoration in connection with belt unloading to insure a proper initial position of the sound head in relation to the media during a subsequent loading operation.

In addition, an object of the invention is to provide a variety of warning signals and condition indicators for dictation and transcription apparatus.

A still further object of the invention is to provide arrangements for establishing an initial phase of a transducer in relation to a magnetic recording media, as well as establishing phasing manually under control of the operator, when necessary.

A particular object of the invention is to provide for multiple use of various components in the equipment, an example being the use of the backspace solenoid for back-spacing and for tripping various mechanisms to terminate the initial phase operation.

The foregoing and other objects, features, and advantages of the invention will be apparent from the following more particular description of the preferred embodiments of the invention as illustrated in the accompanied drawings.

TERMINOLOGY AND ABBREVIATIONS

The following terminology and abbreviations are used in several places in the diagrams of the present case:

| | |
|---|---|
| AE | Automatic Erase |
| Auto Off (AO) | Automatic power shut off |
| B Stage | Power Amplifier Stage |
| BAR | Dictate (Record) bar on microphone |
| BL | Belt is loaded |
| BUZ | Buzzer |
| CON | Conference |
| DIC | Dictate |
| EOB | End of Belt |
| FWD, F | Forward |
| HOLE | Initial phasing aperture in belt |
| HD | Hole Detect |
| HH | Head is in home position ("0" Index) |
| HR | Head Restore |
| LS | Lead Screw contact |
| LET, END LTR, or LTR | Letter indication (index slip) |
| LIS 1, LIS 2 | Listen (Playback) contacts No. 1, No. 2 |
| MOT CONT | Motor Control |
| OSC | Oscillator |
| PB | Playback relay |
| PH1, PH2, etc. | Phase contacts No. 1, No. 2, etc. transferred; Also Φ1, etc. |
| $\overline{PH1}$, etc. | Phase contacts No. 1, etc., not transferred; Also $\overline{\Phi 1}$, etc. |
| PS | Power Supply |
| R | Relay in transcriber unit |
| RP | Relay in dictator unit |
| RR | Relay in dictator unit (also transcriber unit) |
| RRP | Dictator Foot Control Relay |
| REC | Record mode |
| REG | Regulator |
| REV, R | Reverse (Backstep) or Review |
| SEC | Secretary indication (index slip) |
| Second Regulator | Circuit associated with transistor Q7 |
| SPKR | Speaker |
| STP CONT | Stepping Control |
| SW1 and SW2 | Switches in foot pedal |
| T | Transcriber Relay |
| TACH | Tachometer |
| TEL | Telephone |
| $\overline{TEL}$ | Conference *or* Dictate |
| TRA | Telephone Recording Attachment |
| X and Y | Wiring connections (P. 2 of 2) |
| Φ | Phase |

DICTATING UNIT

General Description, Features, Operating Instructions, and Indexing

Figures 1, 1A, 2:
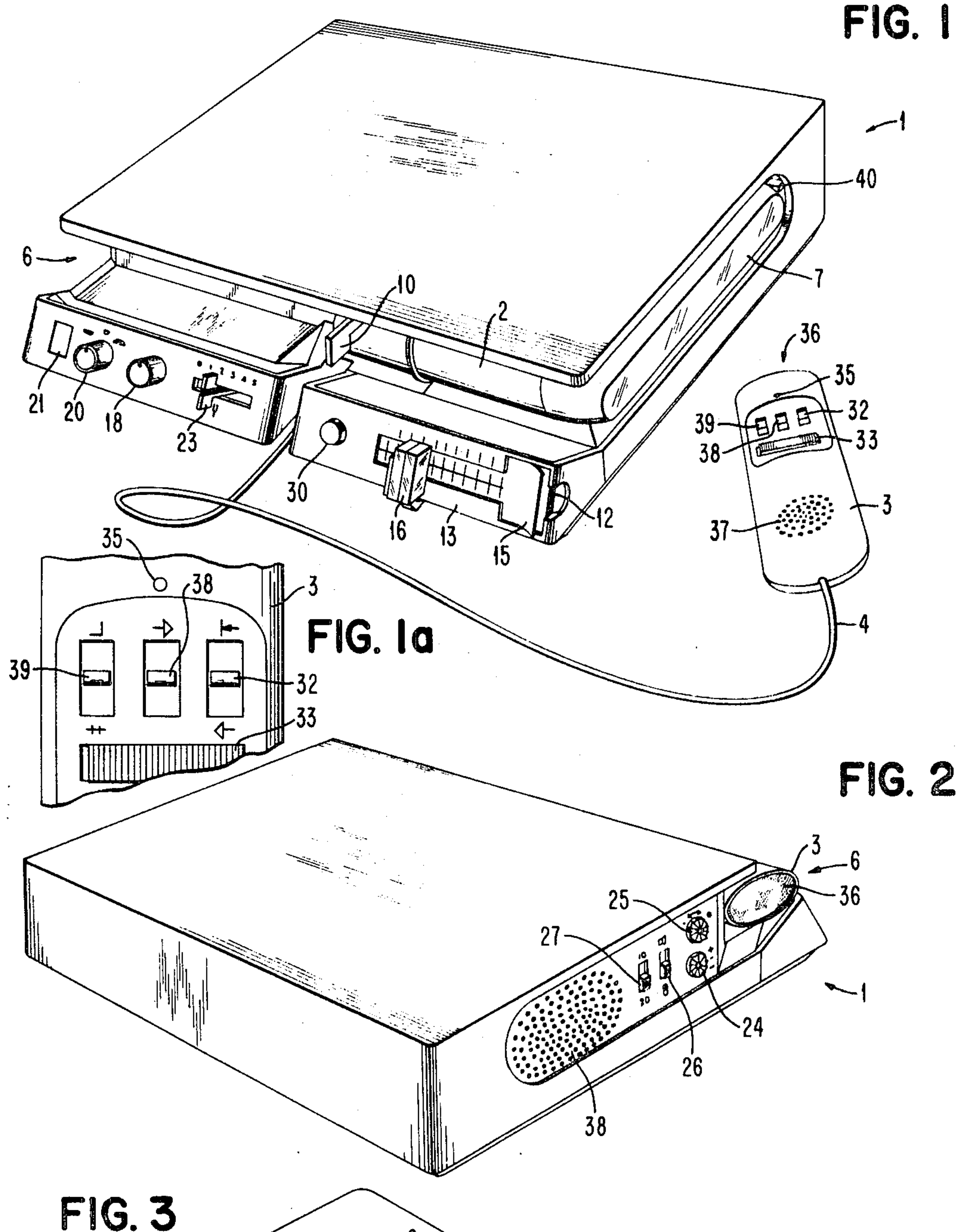
FIG. 1 is a perspective view of a dictating unit with associated microphone incorporating a variety of features according to the present invention.
FIG. 1*a* illustrates a number of operator controls on the microphone.
FIG. 2 is a rear perspective view of the dictating unit of FIG. 1.

The dictating unit 1 according to the present invention is shown in FIGS. 1 and 2, which are external views of the unit, and FIGS. 4–14*f* and 17*a* and 17*b*, that illustrate various internal mechanisms in the unit. The unit makes use of a magnetic belt record media 2 shown in FIG. 3.

Dictating unit 1, has an associated microphone 3 attached thereto by a cord 4, The cord is retractable by mechanisms to be described. Microphone 3, when not in use, is positioned in a microphone well 6, FIGS. 1 and 2.

Dictating Unit Operating Instructions

For convenience, typical operating instructions for dictating unit 1 are presented below:

Loading the Belt

1. Belt 2 is placed on the machine by sliding it over mandrel 7. The arrows 9 on the belt should point toward the machine. The belt is inserted as far as it will go without forcing it.

2. Belt release lever 10 is moved to the left to complete belt loading.

Removing Belt

Belt release lever 10 is moved to the right to partially extend the belt from the machine for easy removal.

Index Slip Loading and Removal

For loading purposes, a complete pad 12 (25 slips) is inserted in holder 13 by sliding the slips to the left. An individual slip 15 is removed by grasping the right end and sliding it out.

Unit Operating Controls

1. Scanning Lever 16. This lever is used to manually locate sound head to any position on the recording belt.
2. Volume Control 18. Controls range of sound volume during playback.
3. Input Selector Switch 20. This switch is placed in the center position for dictation. It also has a telephone position (right) and conference position (left).
4. Voice Modulation Indicator 21. The indicator shows voice or record level. It also serves as a battery indicator for those units equipped with battery.
5. Tunning Lever 23. This lever is normally used for transcribing to adjust the sound head position for proper tracking of sound track.
6. Speed Control 24. This control is used by the transcriber to adjust belt reproducing speed slower (−) or faster (+). It is an optional feature.
7. Input Volume Control 25. Rotating this control clockwise (toward large dot) increases the recording level. Rotating the control counterclockwise (toward small dot) decreases recording level. This is adjusted to give satisfactory record volume with volume control set at the mid-position (dot on volume knob at 12 o'clock).
8. Speaker Selector Switch 26. This switch selects microphone playback (upper position) or speaker playback (lower position).
9. Recording Time Selector 27. This switch gives the dictator the choice of 10 (upper) or 20 (lower) minutes of recording time. Normally this switch will be in the 10 minutes position.

MICROPHONE

Removing

The microphone 3 is removed by lifting it from the machine and extending the cord 4 by pulling the cord from the machine.

Replacing

The microphone is replaced by depressing the retract button 30 and guiding the microphone into its rest position in microphone well 6.

Operating Controls

1. Dictating. Dictating is begun by placing the record-listen selector button 32 in the Record (upper) position,|⊲–, FIG. 1*a*. Dictate bar 33 is depressed and the dictator begins speaking across the pickup element 36. When speaking continuously for long periods, dictate bar 33 can be locked into position by depressing and sliding it to the left, FIGS. 1 and 1*a*. It is unlocked by sliding to the right or moving selector button 32 to the playback (middle) position. An amber lamp 35 on the microphone glows when recording to indicate that the machine is in the record mode.
2. Reviewing. Dictation is reviewed by moving selector button 32 to the review position,⊲–, and releasing. The selector is spring loaded to return to a position midway between record and review, which is the playback position. When the speaker selector switch 26 is in the microphone position (lower), playback is from a speaker 37 located in microphone 3. Otherwise, it is from a speaker 38 in the dictating unit. Each time selector button 32 is moved to the review position,⊲–, the sound head in unit 1, moves back into the recorded material on belt 2 approximately 10 words or 6 seconds. As an option, holdings selector button 32 in the review position causes the sound head to move continuously back in 6 second increments. If the recording time selector 27 is in the 20 minute position, each increment is 12 seconds.
3. Forward Spacing. The sound head is advanced by moving the forward spacing selector button 38 away from the dictate bar. The sound head then moves forward approximately 10 words or 6 seconds. As an option, holding the forward selector up causes the sound head to move forward continuously in 6 second increments. When the Forward selector is operated, the record selector button 32 reverts to the playback mode. If the recording time selector 27 is in the 20 minute position, each increment will be 12 seconds.
4. Index Marking. Moving the secretarial selector button 39 away from the dictate bar to the

⌋ position places a red dot, indicating End of Letter, on the top half of index slip 15. Moving the selector toward the dictate bar to the

┼┼ position places a red dot on the lower half of index slip 15 indicating to the transscriptionist that special instructions are recorded on the belt at that location.

Erasing The Belt

The erase bar 40 is not normally used by the dictator. However, occasionally it may be desirable to completely erase the entire belt. To do this, the erase bar is manually depressed. Since it locks into position, it is not necessary to hold it down. The microphone record-listen selector button 32 is placed in the Record or Listen position.

Warning Tone

A warning tone may be generated at various times, any one of which requires some action on the part of the user. These are:

1. Attempting to dictate with the input selector switch 20 in the telephone mode results in a warning signal. Moving selector switch 20 to the individual dictate position, ▽, restores the machine to normal.
2. A short warning tone is generated 1 minute from the end of the belt. At this time, if dictation is to be continued, the user identifies himself, indicates he is continuing on another belt and places another unused or erased belt on the machine.
3. An end of belt warning signal is generated 15 seconds before the end of the belt. If the dictator continues to record through this signal, the machine automatically shuts off. If this occurs, the belt must be changed or the scanning lever 16 manually moved to the left.

Belt Loading and Initial Phasing

A significant feature of the dictating and transcribing apparatus according to the present invention is the belt loading and initial phasing operation. The apparatus includes mechanisms and circuitry that are operable upon insertion of a magnetic belt on mandrel 7, FIG. 1, to rotate the belt to a predetermined initial position. This insures that the sound head transducer will track a helical path on the belt beginning at an identical position each time the belt is inserted. Belt 2, FIG. 3, has an elongated aperture 2*a* that is sensed in the machine during the loading and phasing operation to establish the initial starting position on the belt.

Reference is made to FIGS. 1–12 for the dictating mechanisms and to FIGs. 25*a*–25*e*, and 29 for various circuitry involved for the dictating unit. The transcribing unit belt loading and phasing mechanisms are shown particularly in FIG. 19 and the circuits in FIGS. 27*a* and 27*b*.

The functions of the belt loading and unloading mechanisms are:

1. Draw the belt into the machine from a partially inserted position.
2. Accurately position the belt in its running position.
3. Prevent partial loading of belt.
4. Partially eject the belt for easy removal.
5. Retract the idler tension roller and drop the sound head for ease of inserting and removing belt.

Figure 7A:
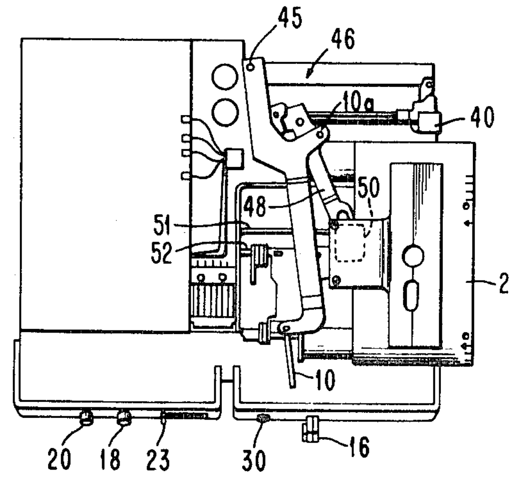
FIGS. 7*a*, 7*b*, and 7*c* illustrate a number of conditions of the dictating unit of FIG. 1 during a belt loading or unloading operation.
Figure 7B:
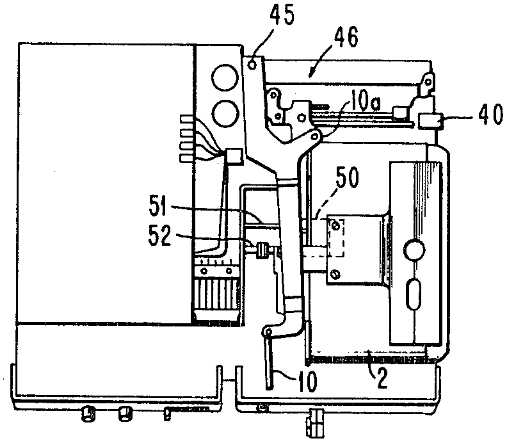
Figure 8:
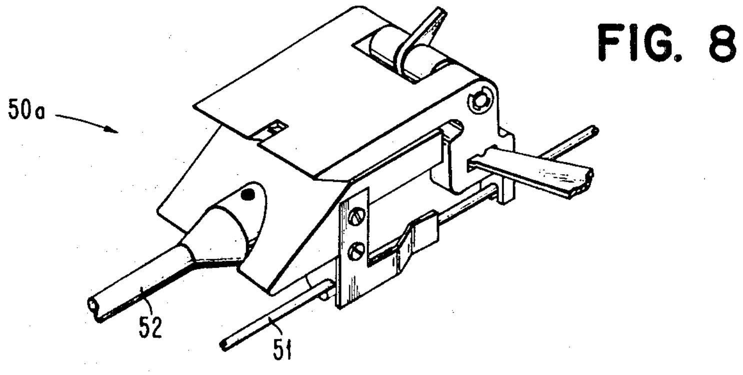
FIG. 8 represents a finger and interposer mechanism in the dictating unit of FIG. 1 for guiding and gripping an inserted belt during belt loading operations.
Figures 9A, 9B:
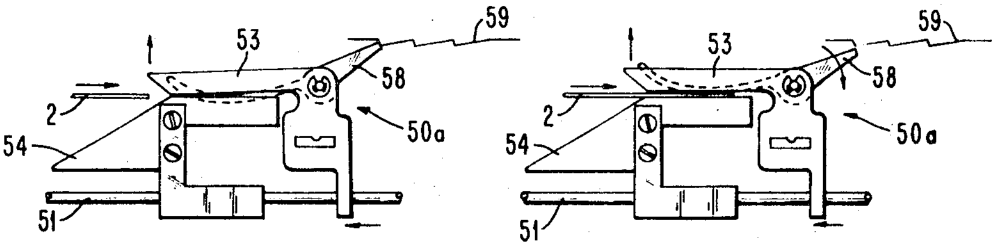
FIGS. 9*a*–9*d* illustrate an operational sequence of the mechanism of FIG. 8.

In order to load a belt 2 in the dictating unit, belt lever 10 is moved to the right as shown in FIG. 7*a*. Lever 10 is pivotally mounted on pivot stud 45. Movement of lever 10 to the right operates various associated linkages and mechanisms to prepare the unit for receiving a belt. Lever 10 has an extension 10*a* that is pivotally attached to a bell crank assembly 46, FIGS. 4 and 7*a*–7*c*. Attachment of extension 10*a* to assembly 46 rotates assembly 46 counterclockwise, FIG. 7*a*, when lever 10 is moved to the right. Assembly 46 includes a link 48 that is attached by extension 48*a*, FIG. 4, to a pin 49 associated with a belt gripper assembly 50. A simplified gripper assembly 50*a* is shown in FIGS. 8 and 9*a*–9*b* to illustrate the principles of operation of this assembly. Assembly 50 is mounted for sliding movement on guide rods 51 and 52. Due to the interconnection of lever 10 with assembly 46 and particularly link 48, movement of lever 10 to the right also moves gripper assembly 50 to the right as shown in FIG. 7*a* in readiness to receive a belt inserted in the unit.

Attached to another member 55 of assembly 46 is a link 56. The front end of link 56 is attached to a rotatable crank 57 that is movable front to back and vice versa. Crank 57 has a link 60 interconnecting it with another crank 61 that is fixedly mounted on rod 52. The function of crank 61 is to move front idler roller 63 to the rear toward rear drive roller 64 to enable the insertion of a belt on the rollers. This is done by provision of various linkages including link 65 that is attached at 65*a* to a smaller diameter axial portion 63*a* of roller 63. Attached to the rightmost end of rod 52 is a crank 68 having an extension 68*a* attached to a slider 70, also connected to the axial center of roller 63. Crank 68 can also be seen in FIG. 5.

Figure 4:
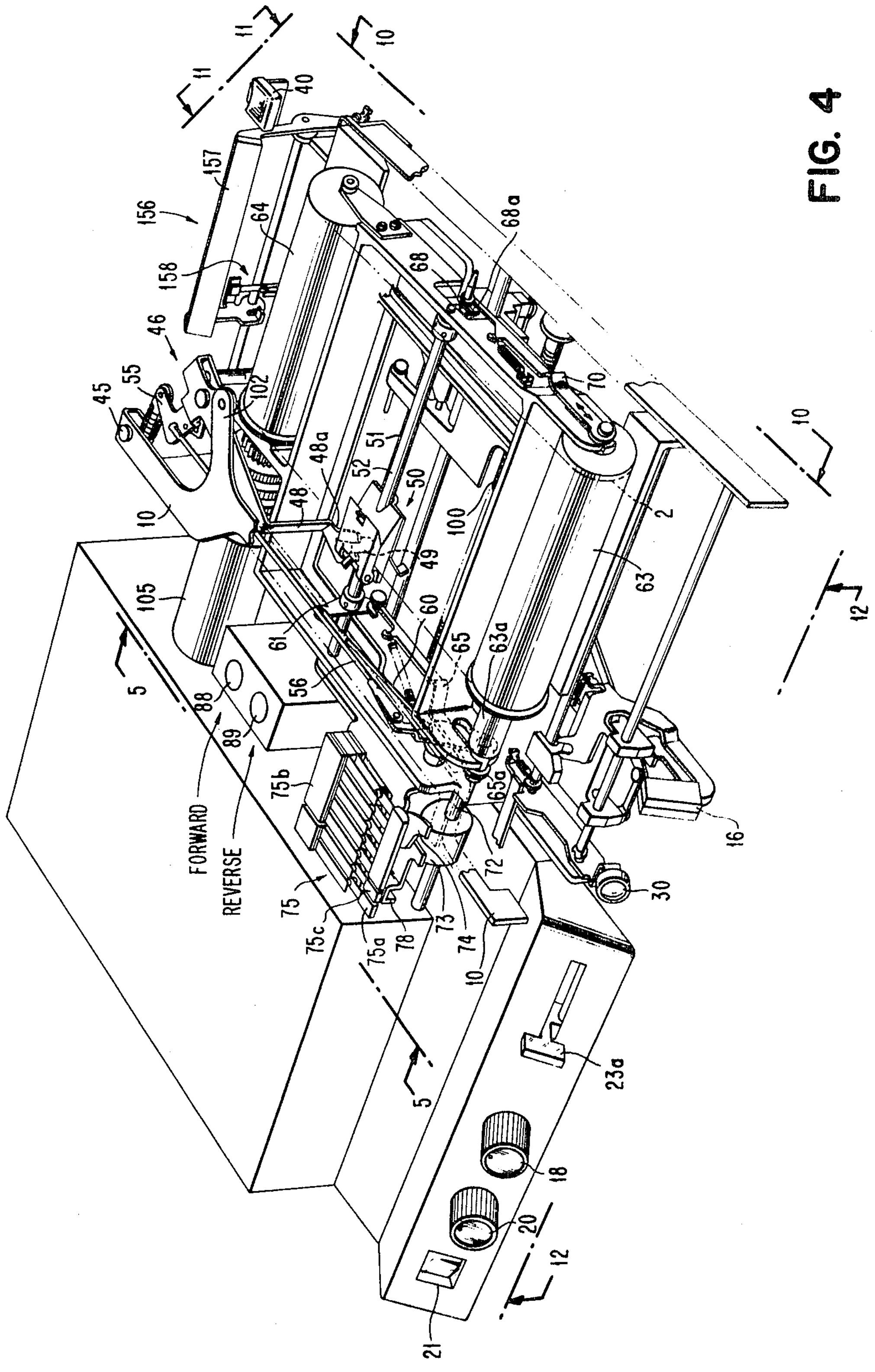
FIG. 4 is a right front perspective view of the dictating unit of FIG. 1 with the covers removed.
Figures 5, 6:
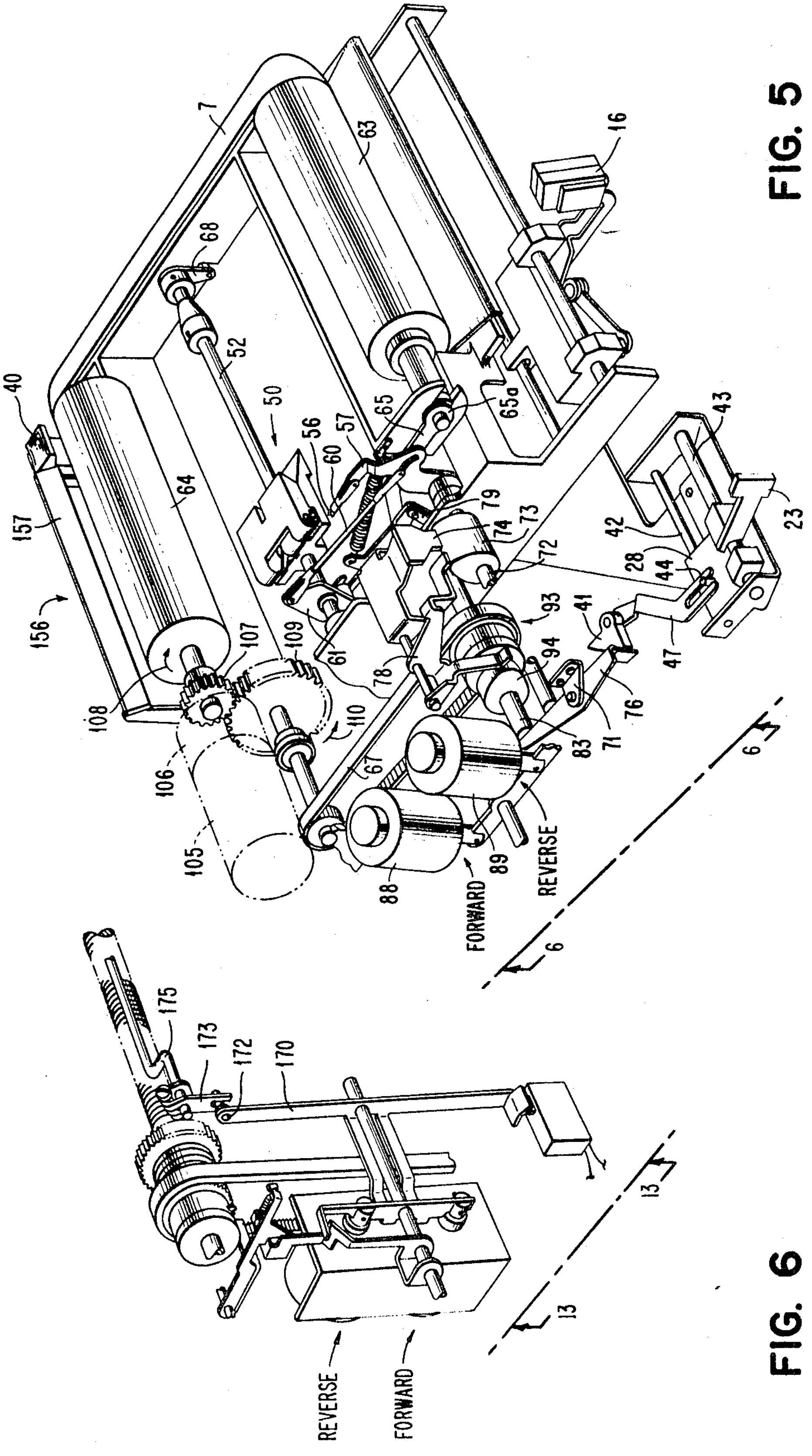
FIG. 5 is a left perspective view of internal mechanisms of the dictating unit of FIG. 1 taken on the line 5—5 in FIG. 4.
FIG. 6 is an underneath view of various mechanisms in the dictating unit of FIG. 1 taken on the line 6—6 in FIG. 5.

The action in contracting rollers 63 and 64 in relation to one another to receive a belt can be observed by reference to both FIGS. 4 and 5. As lever 10 is moved to the right, link 56 is operated toward the front of the machine. This rotates crank 57 toward the front of the machine and due to the interconnection of link 60, crank 61 is rotated in a clockwise direction as viewed in FIG. 5. Rotation of crank 61 pulls link 65 toward the rear of the machine and also rotates crank 68 so that its connection to slide 70 pulls slide 70 toward the rear of the machine. This action, therefore, moves roller 63 to the rear closer to roller 64. Mandrel 7, FIG. 5, is mounted on the same assembly with roller 63 and also moves to the rear of the machine during the action just described.

Figure 10:
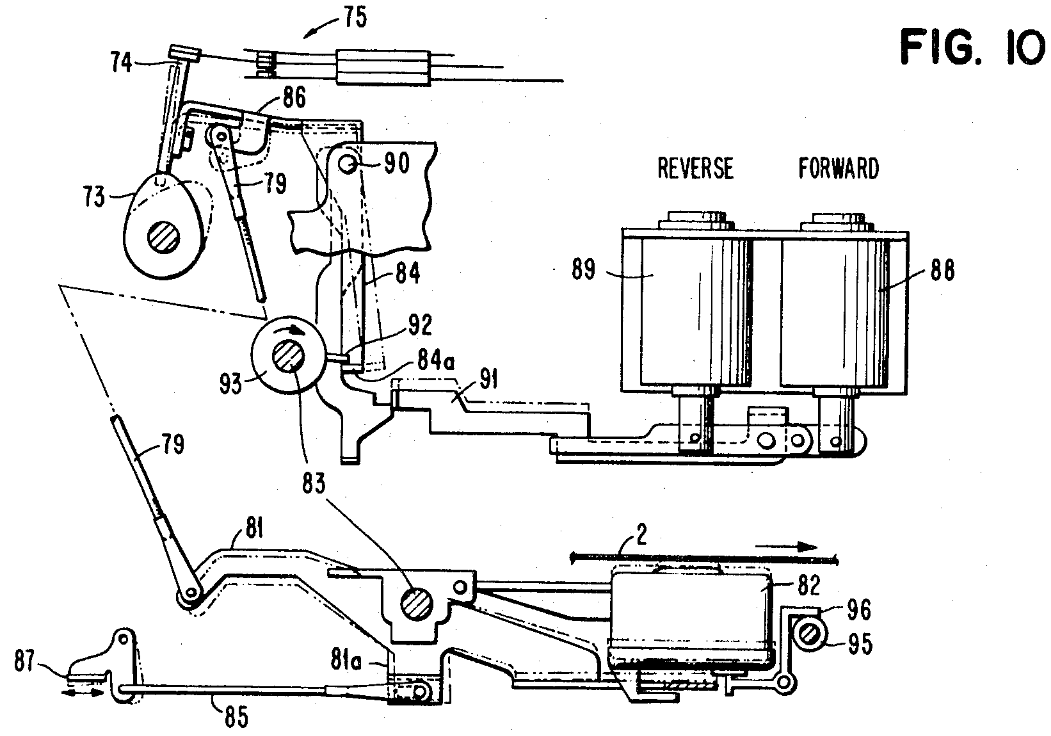
FIG. 10 represents a number of solenoid, contact, and linkage members used particularly during belt loading and phasing operations and taken on the line 10—10 in FIG. 4.

Mounted on the same shaft 72 as crank 57, is a contact operating cam 73 mounted under an operating member 74 to transfer various contacts in a contact assembly 75. Member 74 is also shown in FIG. 10 along with various other linkages and mechanisms having to do with restoration of the head to a left margin position in readiness for insertion of a new belt. A set of belt load contacts 75*a* is opened with movement of lever 10 to the right. A set of Phase contacts 75*b* is transferred to a not phased ($\overline{\text{Phase}}$) condition.

Attached to operating member 74 is link 79 shown in FIGS. 5 and 10, that is connected to a head bail 81 for moving magnetic head 82 into and out of engagement with belt 2. At this time, head 82 is moved out of engagement. Bail 81 is pivotally and concentrically mounted about a shaft 83. Attached to extension 81*a* of bail 81 is a link 85. The other end of link 85 is connected to an operating portion of a pawl retract bail 87. Certain of these mechanisms can be seen to advantage in FIG. 12 as well as FIGS. 10 and 17*a*–17*b*.

When belt lever 10 is to the left, that is, the loaded position, all of the mechanisms in FIG. 10 assume the dashed positions. Upon movement of lever 10 to the right, cam 73 rotates, lifts operating member 74 in particular, and the various elements shown are moved to the full-line condition. Extending as a part of the operating member 74 is a bell crank 86 that is pivotally mounted at 90 and a link 84 having an extension 84*a* movable to the left in FIg. 10 for engagement with a pin 92 on a clutch member 93.

Figure 12:
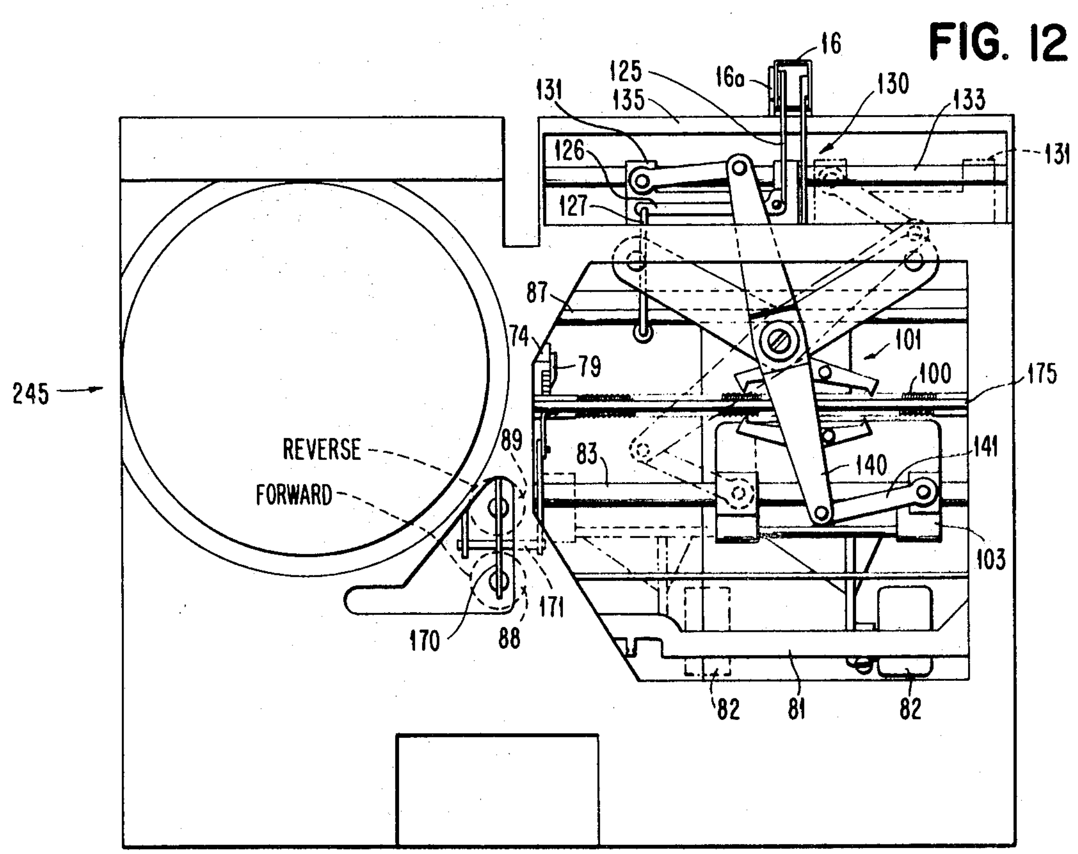
FIG. 12 is a bottom elevation of the dictating unit of FIG. 1 taken on the line 12—12, FIG. 4.
Figure 13:
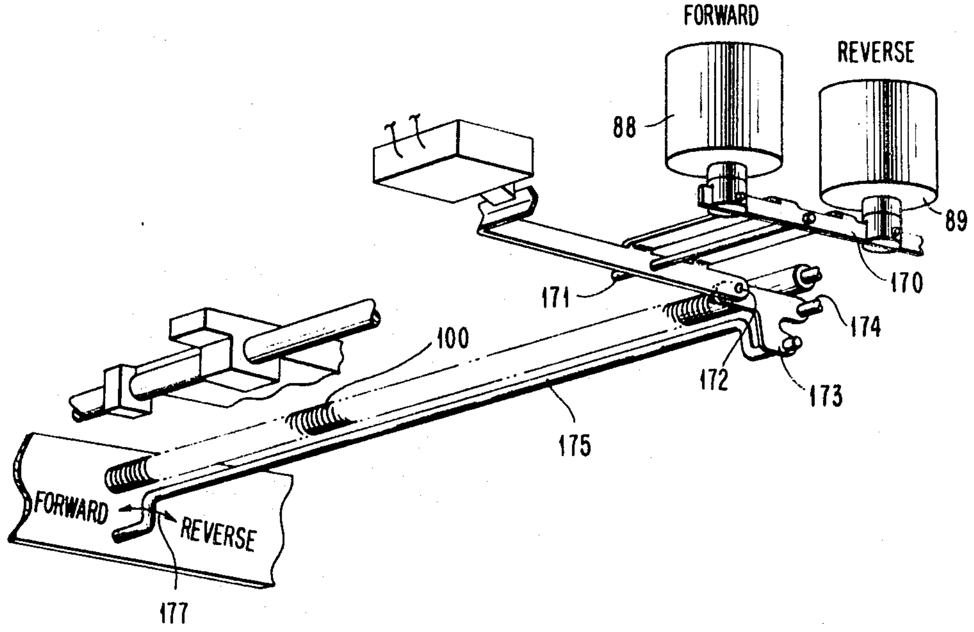
FIG. 13 shows solenoids, pawls and other mechanisms associated with forward and backspacing incrementing on the line 13—13, FIG. 6.

The various mechanisms just described move head 82 out of the way for insertion of a new belt and into engagement with a head restore lead screw 95 by way of a drive engaging member 96. Concurrently with this action, link 85 moves pawl retract bail 87 from the engaged condition shown in FIG. 17*a* to the disengaged condition shown in FIG. 17*b*. This action disengages various pawls from a driving lead screw 100 which frees head 82 for driving movement to home position which is the right margin of the belt. The operation of the pawl mechanisms shown in FIGS. 14*a*–14*f* and 17*a* 17*b*, which incidentally, serve for incremental forward spacing and reverse spacing is discussed in a later section. Reference is also made to FIG. 19 that represents an exploded view of various belt loading mechanisms in the transcriber unit of FIG. 15 that are quite similar to the mechanisms just discussed in FIGS. 4, 5, 7*a*–7*c*, 8, 9*a*–9*d*, 10–13. Corresponding elements are similarly designated. Attention of the reader is also directed to FIG. 6 that represents a view of the forward and reverse solenoids 88 and 89 taken on the line 6—6 in FIG. 5. Certain of the shapes of the elements may differ from the dictator to the transcriber unit, but the functions performed are similar. Reference is also made to FIG. 13 which shows the forward and reverse solenoids from the rear and underneath the dictating unit. This view is taken on the line 13—13 in FIG. 6. To insure proper orientation among the various view of the stepping solenoids, the terms "Forward" and "Reverse" have been included in the drawings wherever appropriate.

Head Restoring Action

Figures 17A, 17B:
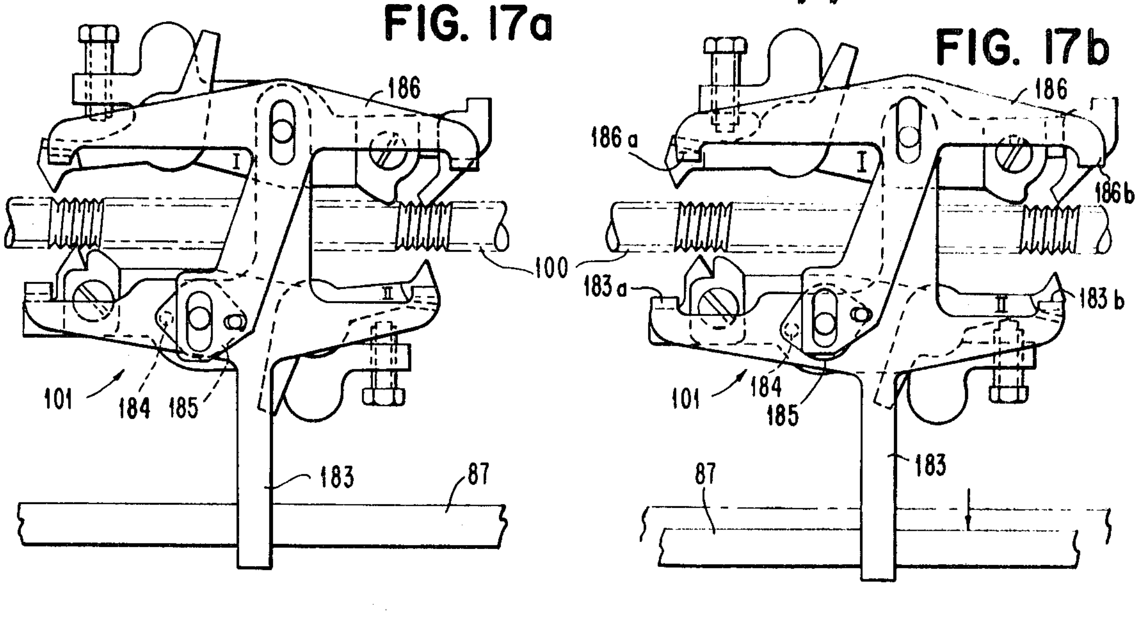
FIGS. 17*a* and 17*b* represent engaged and disengaged conditions of the forward and reverse pawls shown in FIGS. 12 and 14*a*–14*f* in connection with a manual scanning operation.
Figures 18, 19:
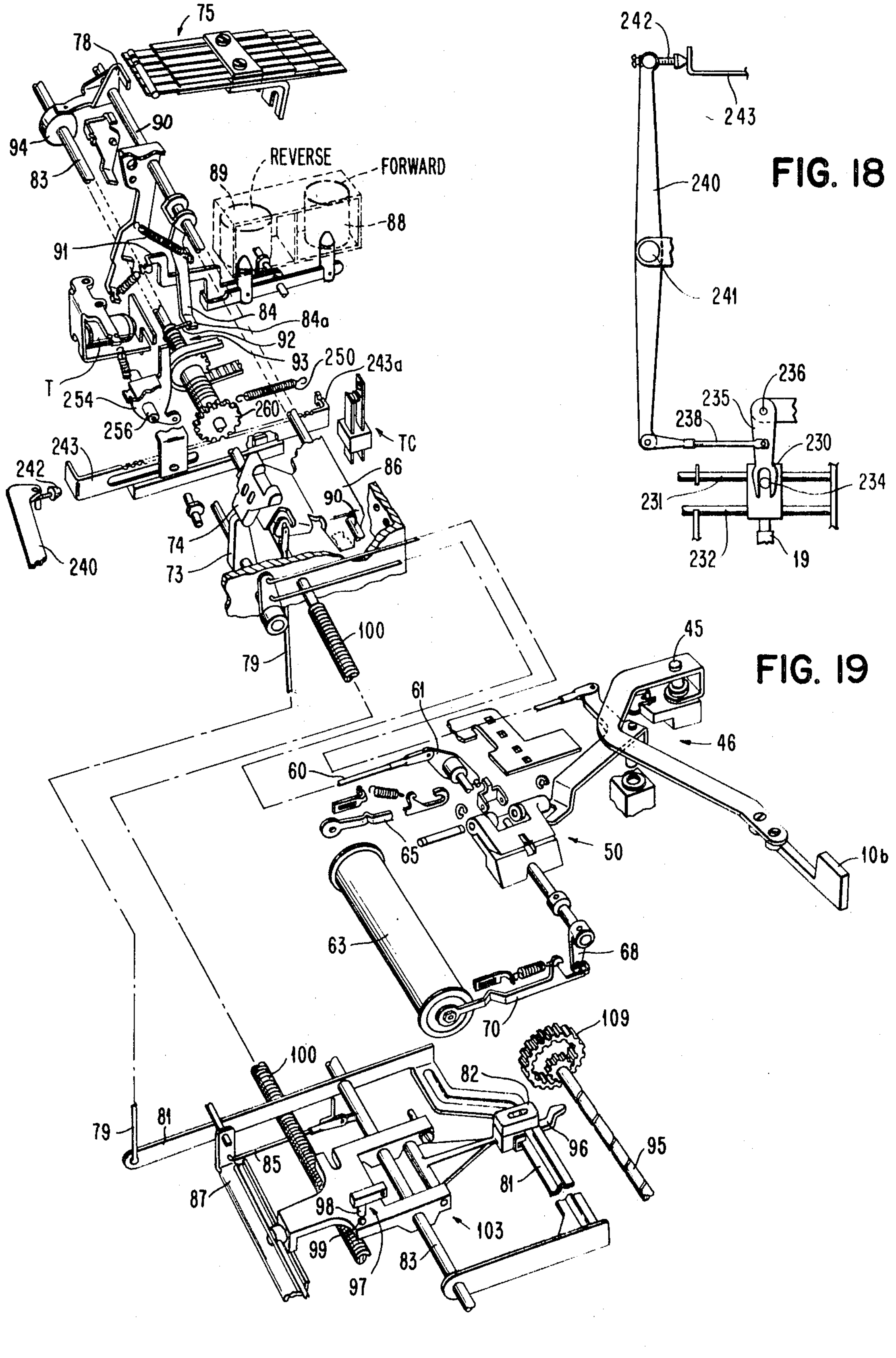
FIG. 18 represents an automatic recall control button and associated linkage for adjusting the recall rack in FIGS. 16 and 19.
FIG. 19 is a semiexploded view of various components in the transcribing unit of FIG. 15 particularly showing portions of the belt loading-unloading mechanism, head restoring mechanism, head driving mechanism, forward and reverse mechanism, and an auto recall mechanism corresponding to that shown in FIG. 16. A large portion of the mechanism is similar to that used in the dictating unit of FIG. 1.

With disengagement of head 82 from belt 2 and the pawls in assembly 101, FIGS. 17*a* and 17*b*, conditions are established for driving head 82 to the home position. This involves movement of the index assembly 16 to the left in relation to an inserted belt and movement of heat 82 to the right in relation to the belt. See FIG. 12. Since the belt loading and unloading mechanisms are positioned at a 90° angle in the transcriber from the position shown in the dictating unit, the direction of head restoring is to the front of the transcribing unit as viewed in FIGS. 15 and 19.

When a belt is unloaded from the machine by movement of lever 10 to the right as previously discussed, the belt load contacts 75*a* are transferred to their normally open condition. However, an additional set of contacts 77, FIG. 11 remains closed and serves to provide a parallel circuit to operate the drive motor for restoring the head to home position. The auto phase contacts 75*b*, FIGS. 4 and 19, are also transferred to their not-phased condition. Reference is now made to the circuit diagram for the dictating unit shown in FIGS. 25*a*–25*e* and particularly to FIG. 25*c* which shows the Phase contacts 1–4. As pictured in 25*c*, the phase contacts are shown in their phased condition. Therefore, under the present circumstances, with belt load lever 10 moved to the right, the contacts are transferred so that the center strap in each set of contacts is in engagement with the upper contact of the individual sets 1–4.

Ordinarily, when a belt is in the dictating unit (or the transcribing unit, for that matter), the belt load contacts 75*a* in the units are closed. In the case of the dictating unit, these contacts are shown in FIG. 25*c*. The various driven devices in the unit derive their source of power from a motor 105, particularly shown in FIGS. 4 and 5. The motor output is reduced by a speed reducer assembly 106, FIG. 5, which drives an output gear 107. Normal direction of motor rotation is indicated by arrow 108, FIG. 5. Gear 107 is engaged with a large gear 109 that due to the engagement, rotates in a direction indicated by arrow 110, FIGS. 5 and 11. As stated, when a belt is in position, motor 105 is rotating to drive gears 107 and 109 constantly. The belt load contacts **75*a* and the head restore contacts 77** are connected in parallel in the circuit of FIG. 25*c* for this purpose. Upon movement of belt lever 10 to the right during an unloading operation, the belt load contacts are opened so that the circuit to motor 105 now is primarily controlled by the head restore contacts 77. These contacts comprise a pair of contact straps 115 and 116, FIG. 11, mounted in a mounting block 117 with connecting leads 118 and 119. Attached to strap 116 is an operating shoe 120 that is positioned in the path of movement of an operating lever 122 associated with magnetic head 82.

Figure 11:
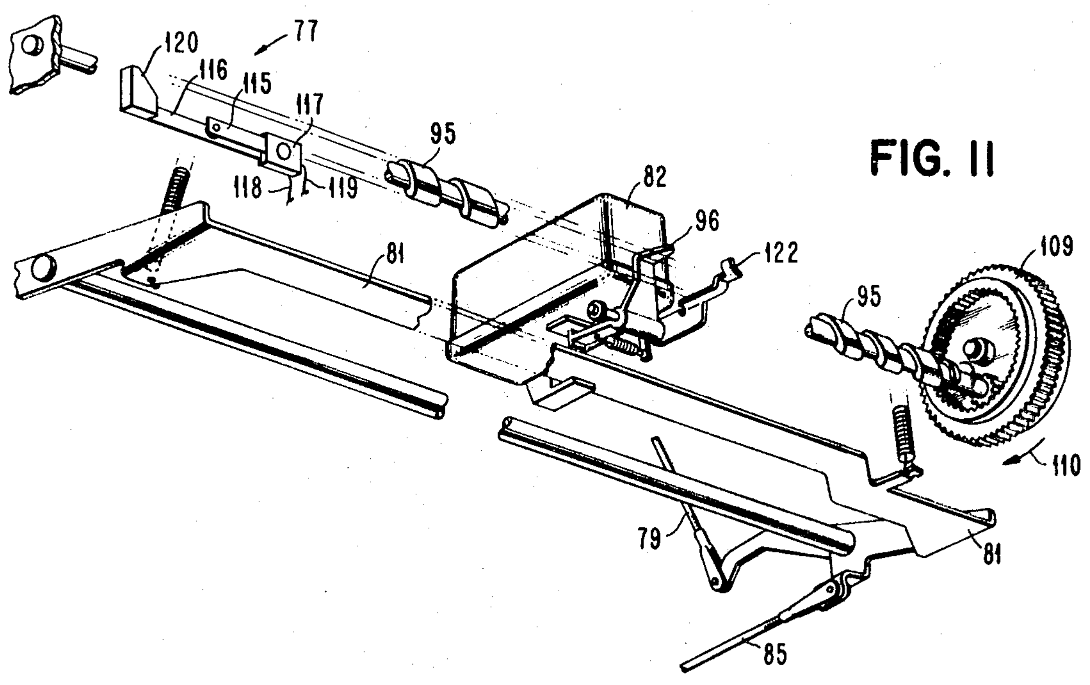
FIG. 11 represents a head restoring mechanism and retract mechanism on the line 11—11, FIG. 4.

Restore leadscrew 95 is driven at a relatively high rate of speed by rotation of gear 109, FIG. 11, and due to the engagement of follower 96 with it, drives head 82 toward the head restore contact assembly 77. As soon as operating element 122 associated with head 82 encounters shoe 120, contacts 77 open, thereby opening the parallel circuit through contacts 77 to deenergize the motor. Thus, motor drive ceases with head 82 positioned all the way to the right ight as shown in FIG. 12, which is the home or restored position of head 82.

With the foregoing action, the equipment is now in readiness to receive an inserted belt.

BELT LOADING AND INITIAL PHASING

Belt Loading Action

Figure 3:
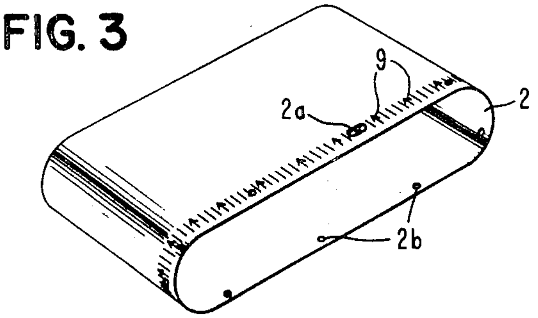
FIG. 3 illustrates a magnetic recording belt media for use in the dictating unit of FIG. 1. The belt media may also be used in a transcribing unit.

In order to load belt 2, FIG. 3, in dictating unit 1, the operator grasps belt 2 with arrows 9 pointing in toward the unit and slips the belt over mandrel 7. The belt is inserted as far as it will go without forcing it. As is usual, the placement of belt 2 on mandrel 7 may be at any location with respect to timing aperture **2*a*, FIG. 3. The positioning of aperture 2*a* is immaterial at this time, since in accordance with the present invention, means is provided for rotating belt 2 under control of aperture 2*a* to a predetermined initial position with respect to magnetic head 82. This applies to any belt that may be inserted in dictating unit 1**. It also applies to any belt that is inserted in the transcribing unit shown particularly in FIGS. 15 and 19.

Figure 7C:
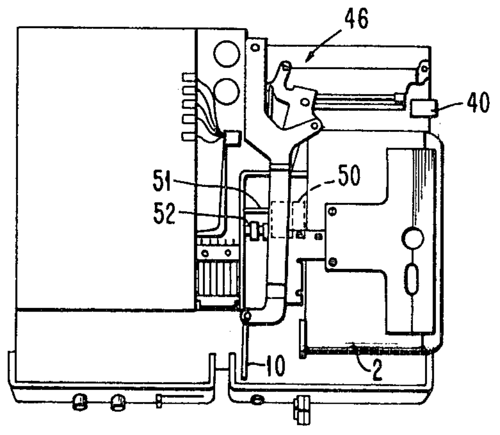

Following insertion of belt 2 on mandrel 7, the operator moves belt lever 10 to the left FIGS. 1, 4, and 7*c*.

Prior to and during such movement of belt lever 10 to the left, gripper assembly 50 (**50*a***) is operated according to the sequence shown particularly in FIGS. 9*a*–9*b*. FIG. 9*a* shows the gripper assembly just prior to insertion of belt 2 between the upper and lower fingers 53 and 54. Movement of belt 2 between fingers 53 and 54 operates a sensing lever 58, FIG. 9*b*. Normally, when no belt 2 is inserted in gripper assembly 50 (**50*a*), sensing lever 58 contacts a rack 59 which retains gripper assembly 50 (50*a***) in the ready condition shown in FIG. 7*a*, and prevents movement of the entire belt gripping and loading assembly, including belt lever 10, to the left.

Figure 9C:
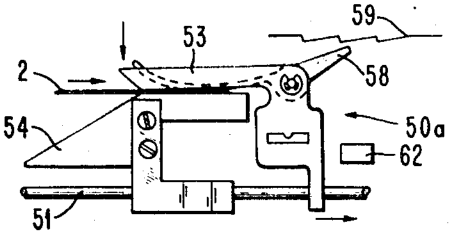
Figure 9D:
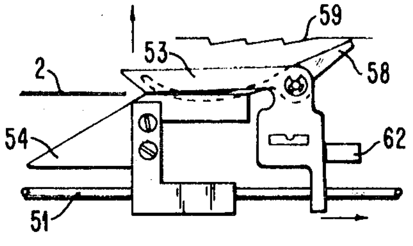

However, insertion of belt 2 operates sensing lever 58 to clear rack 59 as at FIGS. 9*b*, 9*c*, and 9*d*. Link 48, FIG. 4, acts to rotate upper finger 53 to grip belt 2 when lever 10 is moved to the left. It should be observed that the gripper assembly in FIGS. 8 and 9*a*–9*d* is shown from the rear of the machine and that movement of belt 2 in these figures is just the opposite to such movement in the other figures including FIGS. 4 and 7*a*–7*ca*. Gripping of belt 2 continues until belt lever 10 and gripper assembly 50 have almost reached the furthest position in unit 1 during the belt loading operation. Toward the very end of such movement, finger 53 encounters a stop 62 which rotates finger 53 to release belt 2. The timing is such that the release of belt 2 occurs just as the left most edge of belt 2 (rightmost edge in FIGS. 9*a*–9*d*) comes in contact with the flanges on rollers 63 and 64.

The movement of belt lever 10 to the extreme left or belt loaded condition, FIG. 7*c*, reverses the movement of all of the various mechanisms associated therewith including the gripper operating assembly 46 links 56 and 60, cranks 57, 61, and 68, and cam member 73. Rotation of cranks 61 and 68 moves roller 63 further away from roller 64 and applies tension to belt 2 in the unit.

In FIG. 10, all of the elements shown assume the dashed line condition, with the exception of switch operating member 74 that is held in the solid line condition due to engagement of bell crank 86 with an auto-phase latch member 91.

Phasing

Movement of cam 73 also closes belt load contacts **75*a* to supply power to energize motor 105 which thereafter through connections shown particularly in FIG. 5, including pulley 67 operates clutch assembly 93, shown both in FIGS. 5 and 10. The activation of clutch assembly 93 drives shaft 83 which also supports lead screw 100, FIG. 19. Associated with clutch assembly 93 is a lead screw phase cam 94 which operates against a lead screw zero phase operating member 78, FIGS. 5 and 19. Engagement of clutch assembly 93 and driving of lead screw 100 from motor 105 rotates cam 94, which is fixed on shaft 83 in a predetermined condition to indicate a zero phase condition of lead screw 100. As soon as lead screw 100 reaches a zero phase condition, cam 94 operates member 78 to transfer zero phase contacts 75*c* in contact assembly 75. As may be seen in FIG. 19, member 78 is affixed to the same shaft 90 to which bellcrank 86 and link 84 are affixed. Also, see FIG. 10. Therefore, rotation of member 78 clockwise rotates elements 84 and 86 clockwise latching bellcrank 86 on latch 91 associated with Reverse magnet 89 and moving extension 84*a* into the path of travel of pin 92 that is associated with clutch assembly 93. The structure is so arranged that pin 92 simultaneously encounters extension 84 *a* of link 84**, FIGS. 10 and 19.

The engagement of pin 92 with extension **84*a* disengages clutch assembly 93 and the rotation of lead screw 100 stops when it is in the zero phase condition. As stated, the lead screw contacts 75*c*** are closed to indicate such condition, FIG. 25*b*.

Following zero phasing of the lead screw, motor 105 continues to run and rotates belt 2 through the connection of gear 107 with drive roller 64. Belt 2 has been rotating all during the time of rotation of lead screw 100 prior to lead screw 100 reaching the zero phase condition.

Positioned in unit 1 in line with aperture **2*a* of any inserted belt 2 is a set of aperture sensing contacts 97, FIG. 19. Contact assembly 97 comprises an upper contact element 98 arranged to drop through aperture 2*a* and a lower electrical contact 99 mounted on a portion of sound head carriage member 103, FIG. 19. Contact assembly 97** is also referred to as the "Hole Detect" assembly, FIG. 25*b*. As soon as aperture **2*a* is detected during rotation of belt 2, contact assembly 97 closes and completes a circuit to ground through the previously closed lead screw contacts 75*c***. The completion of the foregoing circuit biases transistor Q 23, FIG. 25*c*, to energize Reverse magnet 89 in FIG. 25*b*. The energization of magnet 89 moves latch 91 to the dashed line position, FIG. 10, and releases link 84 which permits bell crank 86 and contact operating member 74 to rotate counterclockwise, thereby transferring contact assembly 75 to the "phased" condition. All of the phase contacts 1–4 assume the condition shown in FIG. 25*c*. Up until this time, driving of the motor, FIG. 25*c*, has been through the phase contacts 3, transferred.

The dropping of bell crank 86 also moves bail 81 counterclockwise through line 79 to move head 82 into engagement with belt 2 and to reengage the lead screw driving pawls due to movement of retract bail 87, FIG. 17*a*.

By the foregoing action, belt 2 has been moved into operating position on rollers 63 and 64, lead screw 100 has been phased to a zero condition, and belt 2 has been rotated to an initial phase condition with respect to sound head 82. This action occurs in dictating unit 1 or transcribing unit 5 each and every time that a belt 2 is inserted in one of the respective units. In this fashion, each belt, when initially inserted in position for operation is accurately phased with respect to the sound head 82 and tracking during recording and playback, or during subsequent transcription of a belt proceeds in a precise manner. The parameters of the system are such that the tracking is accurately maintained within desired limits throughout the remainder of the recording area on an inserted belt. Essentially, this eliminates the necessity for resynchronizing or phasing the belt with respect to the transducer on each and every cycle of rotation of the belt, as in some prior art devices. It is apparent that the driving arrangements can be such that the motor drive is disconnected from whichever of the sound head driving means or record media driving means reaches a zero phased condition first and then disconnected from the remaining driving means to terminate the phasing operation.

COMPATIBILITY OF BELT LOADING MECHANISM WITH OTHER TYPES OF RECORD MEDIA

The belt loading and initial phasing mechanisms according to the present invention offer a significant advantage when considered in relation to belt record media that differ from that shown in FIG. 3. As an example, the belt record media used in the IBM equipment described in the Customer Engineering Instruction and Reference Manuals in the "Other References" section above make use of a belt record media having only a series of holes, such as holes **2*b*, FIG. 3. These media do not have an elongated aperture, such as aperture 2*a*. In the event that the operator of the equipment desires to make use of a belt media without an aperture 2*a*, he simply inserts such media in the mechanism as just described for belt 2. The machine structures and circuits are such that an attempt is made to sense an aperture 2*a*in order to initially phase the belt media. The equipment proceeds through the belt loading and initial phasing routines but since aperture 2*a* is absent, the hole detect contacts 97, FIGS. 19 and 25*b* do not close to operate the reverse solenoid 89 through transistor Q23**.

A pseudo-phase condition is established in a very simple manner by the operator by operating the Reverse space button 32, FIGS. 1 and **25*a*. This energizes transistor Q23 and the reverse solenoid and operates latch 91, FIG. 10, to release bell crank member 86, operating member 74, and bail 81 to prepare the equipment for use, just the same as if an aperture 2*a*** had been sensed by the equipment. In this manner, the equipment is rendered compatible with either type of record media, and in fact will operate with a belt record media having no apertures at all.

Belt Unloading

Upon termination of dictation, or end of belt, belt 2 is ejected from dictating unit 1 by operation of belt lever 10 to the right, FIG. 1, in a manner comparable to that described under the section concerning initial belt loading conditions. Such operation moves roller 63 closer to roller 64, operates cam 73, moves head 82 away from the belt record media and retracts the pawl assembly 101 in preparation for insertion of another belt record media.

In the case of the transcribing mechanisms shown in FIG. 19, the belt eject and unloading operation proceeds in a comparable manner to that for the dictating unit. The difference lies primarily in the direction of belt ejection, which in the case of the transcriber, is from the front of the unit, FIG. 15.

Manual Tuning

In order to compensate for any slight differences in synchronization between a recorded track on belt 2 and magnetic head 82, the units are provided with manual tuning means controlled by the knob 23 that enables the operator to also accurately position the sound head with respect to the magnetic belt for best signal reproduction. The mechanism operates in a manner similar to that described in the IBM Dictating Equipment Manuals referred to in the "Other References" section above. That is, means is provided for urging the lead screw 100 in a preferred direction in the unit and the manual tuning structure, including knob 23 is movable to adjust the lead screw against the spring bias normally applied to it. In FIG. 5, tuning knob 23 has an associated block 28 arranged to slide left to right and right to left on guide rods 42 and 43. Block 28 carries a pin 44 engaged with a slot in a link 47 that carries a cam element 41. Cam element 41 acts against a lever 76 that is centrally pivoted on a bracket 71. One end of lever 76 bears against shaft 83 against a predetermined spring bias, not shown. The bias is arranged to urge shaft 83 and associated lead screw 100 to the left in FIG. 5. With the structure shown, movement of tuning knob 23 operates cam 41 against lever 76 thereby moving shaft 83 and lead screw 100 left to right and right to left in unit 1. Due to engagement of pawl assembly 101, FIGS. **17*a* and 17*b* with lead screw 100, such movement of lead screw 100 adjusts the location of head 82 with respect to the tracks on belt record media 2** for optimum tracking.

OPERATION OF DICTATING UNIT

Preparation for Dictation

It is assumed that the mode control knob 20 has been positioned to the center, or dictate position. Volume control 18 is set to a midrange position. Following insertion of belt 2 and the automatic initial phasing just described, the unit is essentially ready for dictation. The operator inserts a pad of index slips 12 in housing 13. Head 82 is now located at the home position on belt 2 as reflected by the relative location of scanning lever 16 with respect to the top index slip 15. As seen in FIG. 1, scanning lever 16 is somewhat displaced to the right from the home position. At any time during the course of dictation, head 82 may be manually moved to a desired location on belt 2 by operation of scanning lever 16. Reference is made to FIG. 12 for the action involved. FIG. 12 represents a bottom elevation of the dictating unit with the front of the unit at the top of the figure. Scanning lever 16 has a depressable control element **16*a* that operates through a link 125 and additional members 126 and 127 to move bail 87 between the two conditions shown in FIGS. 17*a* and 17*b* to engage and disengage the pawl assembly 101. Depression of button 16*a*, therefore, disengages pawl assembly 101 enabling ready movement of sound head 82 back and forth in relation to an inserted belt 2**.

Scanning lever 16 forms part of a scanning assembly 13 that includes a member 130 mounted for movement from the full line condition shown in FIG. 12 to the dashed line condition on a guide rod 133. Pivotally attached to member 131 is a link 135 that operates a lever 140 having another link 141 attached to its rearmost extremity. Link 141 is attached to sound head carriage 103 that mounts sound head 82. With the structural arrangements shown, movement of scanning lever 16 from left to right in FIG. 12 moves carriage 103 from right to left, thereby moving sound head 82 from right to left in relation to an inserted magnetic belt 2. Conversely, movement of scanning lever 16 from right to left moves sound head 82 from left to right in relation to the belt record media 2.

Prior to commencement of dictation, the dictator will also have selected a 10 minute or 20 minute recording time by operation of button 27, FIG. 2. He will also have moved button 26 to select speaker 38 in unit 1 or speaker 37 in microphone 3 for use during playback of dictated material.

Following preparation for dictation as discussed, the dictator grasps microphone 3, which is assumed to be stored in microphone well 6, FIGS. 1 and 2, and pulls it toward him a convenient distance for use during dictation. Microphone 3 is interconnected with the machine circuits through cord 4 and when microphone 3 is stored in well 6, cord 4 is wound on a cord reel assembly 245, that is better seen in FIG. 12. Cord reel assembly 245 maintains a spring tension on cord 4 that tends to pull the cord into the unit. When microphone 3 is in use, cord 4 is maintained at a length determined by the dictator. When dictation is finished, the dictator may retract cord 4 by depressing button 30, FIG. 1, whereupon cord reel assembly 245 pulls cord 4 into the unit. Microphone 3 is permitted to follow the cord as it winds into the unit and is again placed in storage well 6.

Reference is made to the Wing publication in the May, 1967 IBM Technical Disclosure Bulletin in the "Other References" section for a description of a typical cord reel assembly that will fulfill the functions required by cord reel assembly 245.

Dictation (Record) Mode

In order to begin dictating, the dictator moves mode control button 32, FIGS. 1 and 1*a*, to the upper (dictate) position. This establishes a recording mode of operation wherein a Playback (PB) relay is deenergized The playback relay is energized only during a listen (playback) mode, to be discussed. With the dictate mode established by appropriate positioning of mode control button 32 on microphone 3, the circuits in the unit are completed for recording of dictation whenever the record bar 33, FIGS. 1, 1*a*, and 25*a*, is moved to an operating position.

Figure 25A:
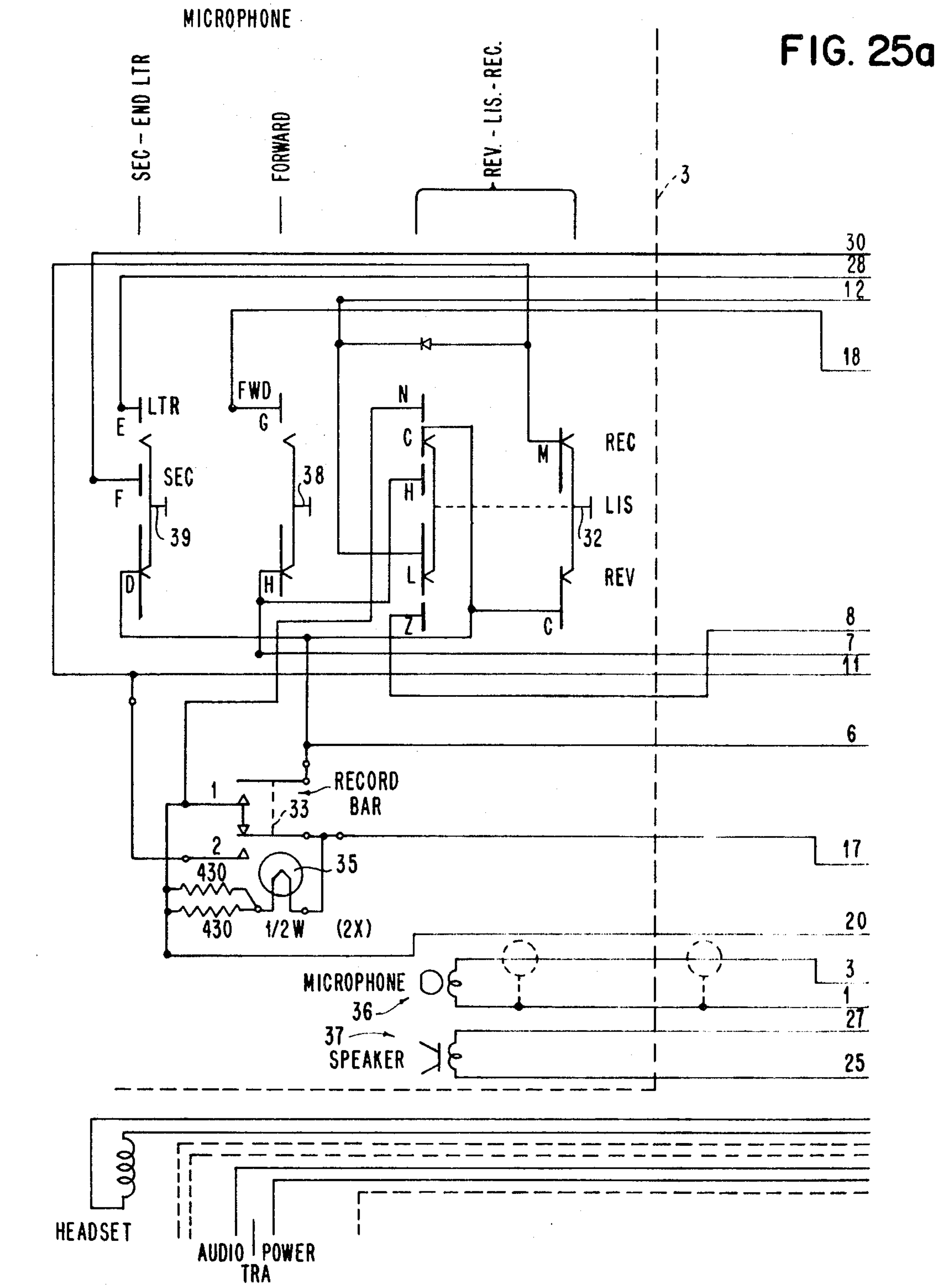
FIGS. 25*a*–25*e*, when arranged as shown in FIG. 26, comprise a detailed circuit diagram for the dictating unit of FIG. 1.
Figure 26:
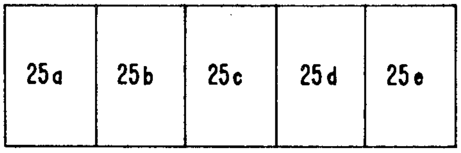
Figure 25B:
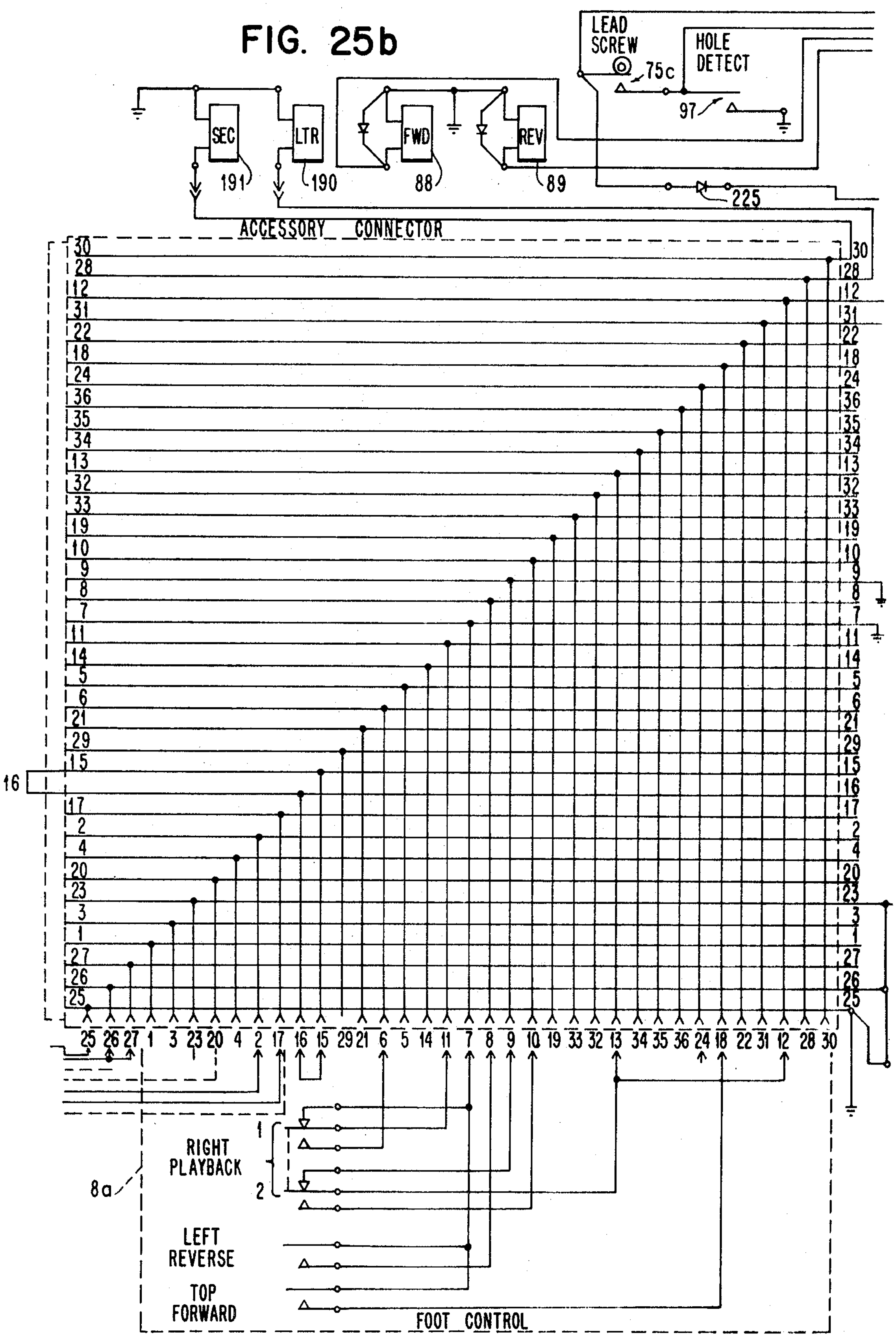
Figure 25C:
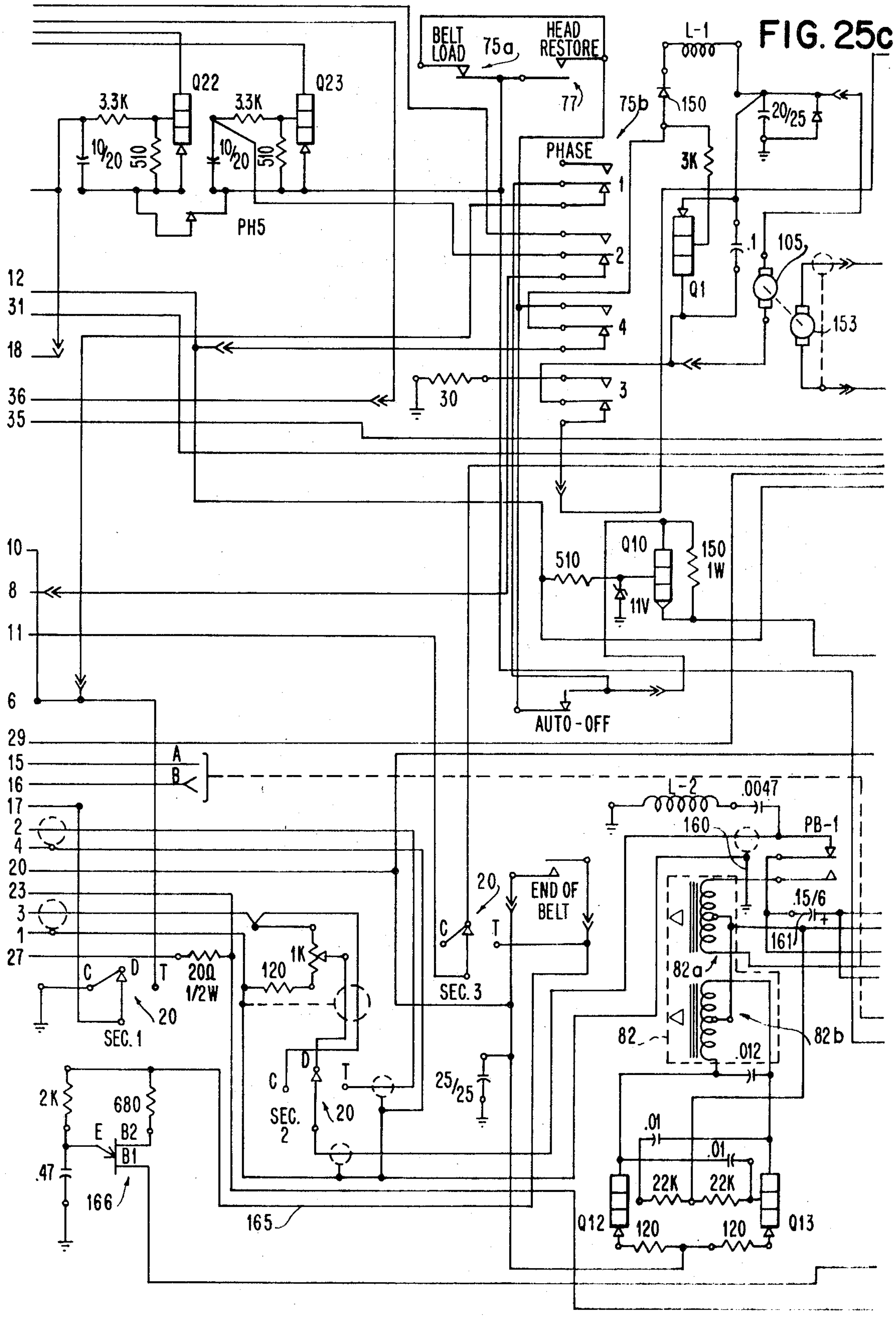
Figure 25D:
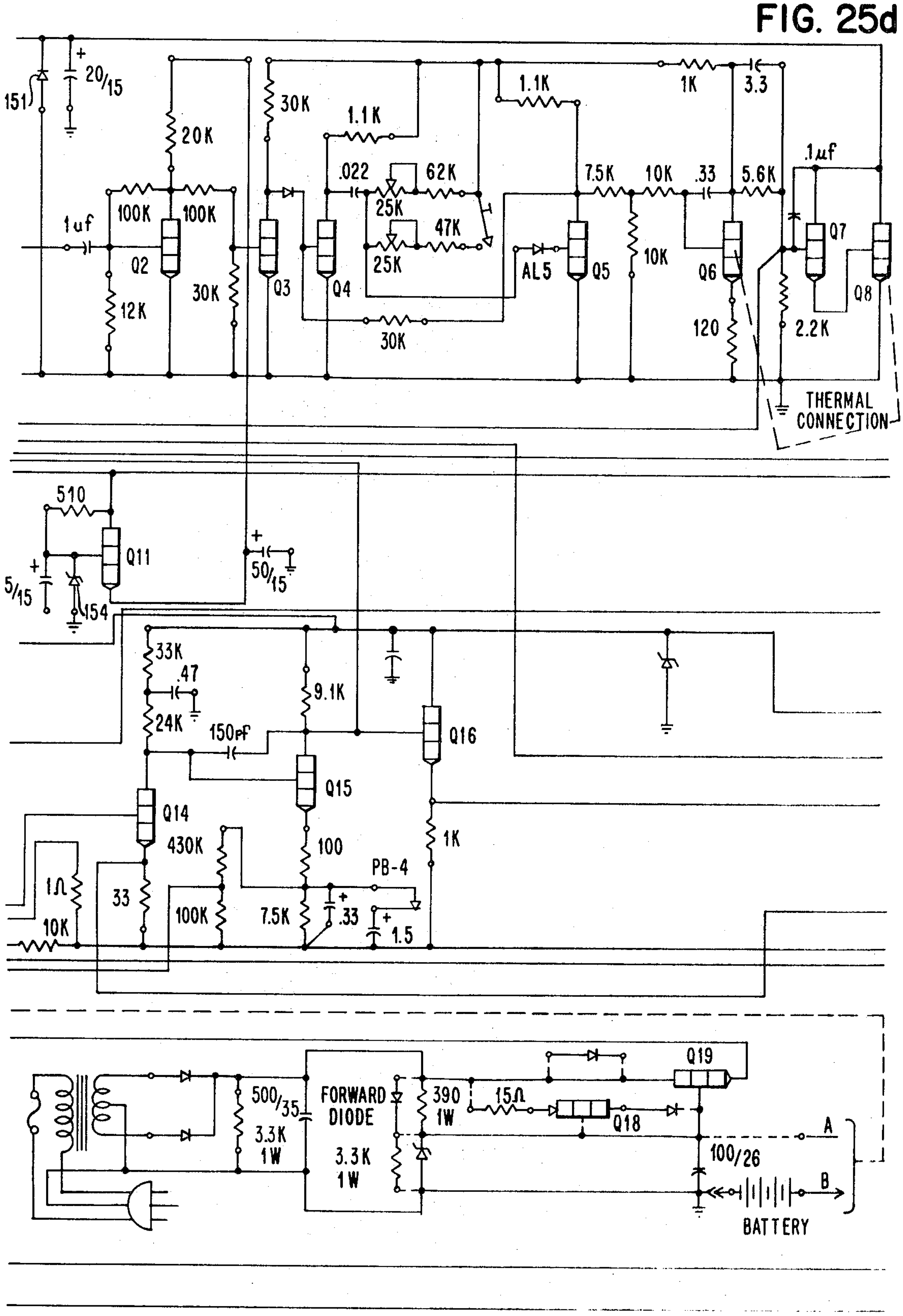

Normally, power is supplied from a DC power source comprising transistors Q18 and Q19 or a battery from terminals A and B, FIG. 25*d*. If the conventional power supply from transistors Q18 and Q19 is used, the output voltage, which is a nominal 16.0 volts is provided over a circuit from transistor Q19 through the Belt Load contacts 75*a*, the auto-off contacts, and several parallel paths, FIG. 25*c*. With battery, transistor Q10 is energized to provide collector voltage to amplifier transistors Q14, Q15, and Q16, FIG. 25*d*, with AC, potential is supplied through the 150Ω/1 watt resistor and Zener diode. Also a path is completed to transistors Q20 and Q21 to operate meter 21, FIG. 25*e*. The steady state condition of meter 21, when not dictating, gives an indication of the status of the battery in FIG. 25*d*. Transistor Q21 is saturated most of the time so that the full battery potential is across meter 21. When dictating, transistor Q20 is driven by the amplifier transistors Q14, Q15, and Q16 and Q21 drives meter 21 in a fluctuating manner to indicate recording signal level. Transistors Q20 and Q21 act as a single shot and only a brief signal is required from Q16 to Q20 and Q21, to give an indication of signal level.

Another path from the auto-off contacts is through phase 1 contacts, the lower section being closed at this time, FIG. 25*c*, and by terminal 6 through an accessory connector, FIG. 25*b* to the microphone, FIG. 25*a*. The power supply path is seen to pass from terminal 6, FIG. 25*a*, to various connections on the secretary and end-of-letter switch operated by button 39, two sections of the record-listen-review switches operated by button 32, and the upper set of a pair of contacts operated by record bar 33. The rightmost section of the record-listen-review switches complete a supply path through the lower switch section of the pair operated by record bar 33.

At the present time, the forward space button 38 and the secretary-end of letter button 39 are positioned on microphone 3 to locate the associated switch sections in the positions shown in FIG. 25*a*. The record-listen-review button 32 is presently moved to the upper position thereby opening the rightmost switch section from terminals C to M and positioning the leftmost switch section to complete a circuit from switch contacts L and N. Accordingly, the circuit for activating motor 105 in FIG. 25*c* is now primarily under control of the dictate (Record) bar 33, FIG. 25*a*. The path through the rightmost switch section operated by button 32 is open at this time, but potential exists from terminal 6, FIG. 25*a*, through the upper switch section operated by record bar 33, terminal N, terminal L, terminal 12 through the accessory connector, FIG. 25*b*, terminal 12 in FIG. 25*c*, and thence through phase 4 contacts, closed as shown, through diode 150, coil L–1, motor 105, Phase contacts 3, closed as shown, and transistor Q8 FIG. 25*d* to ground. Motor speed is sensed by a tachometer 153 which drives a motor control or regulating circuit including transistors Q2–Q8, FIG. 25*d*. Dynamic braking of motor 105 is provided by transistor Q1, FIG. 25*c*. In normal running, diode 151, FIG. 25*d*, is biased off. When Record bar 33 is released, a circuit is completed for current to flow through the base of transistor Q1 from a connection at the bottom of motor 105 and including the Phase 3 contacts. The current flow is then entered in the collector of transistor Q1 which acts a short circuit across motor 105 and thereby effectively brakes the motor.

Returning to terminal 12, FIG. 25*c*, another path is completed to the base of transistor Q10 to render it active for supplying collector voltage to transistors Q14, Q15, and Q16, in FIG. 25*d*. Another circuit is completed to render transistor Q11 active which with the associated Zener diode 154 insures a desired predetermined voltage level in the voltage regulating circuit including transistors Q2–Q8.

Besides the foregoing, the power supply potential is directed from the upper switch contacts operated by record bar 33, FIG. 25*a*, down and through terminal 20 connections of the accessory connector and in a split parallel path, the lower path, FIG. 25*c* being directed to the emitter circuits of transistors Q12 and Q13 which serve as an erase and bias oscillator circuit for the windings in head 82. The upper path continues through FIG. 25*d* and to the base of transistor Q9 which is rendered active to energize relay RR, FIG. 25*e*. An RR–1 contact is included in circuitry in the lower portion of FIG. 25*e*.

Depression of Record bar 33, FIG. 25*a*, also applies potential to lamp 35 to indicate that recording of signals is in process. The circuit is through the filament of lamp 35, terminals 17 of accessory connector in FIG. 25*b*, and through section 1 of the mode switch 20 to ground, FIG. 25*c*.

To record signals, the dictator speaks into microphone transducer element 36 which supplies signals to the base of transistor Q14, FIG. 25*d*. The circuit for operation of transducer 36 is from a ground connection at 160, FIG. 25*c*, terminal 1 of the accessory connector, FIG. 25*b*, the transducer, terminals 3 of the accessory connector, a 1 KΩ potentiometer and section 2 of switch assembly 20, FIG. 25*c*, the playback relay contacts PB–1, closed as shown, and capacitor 161 to the base of transistor Q14.

Figure 25E:
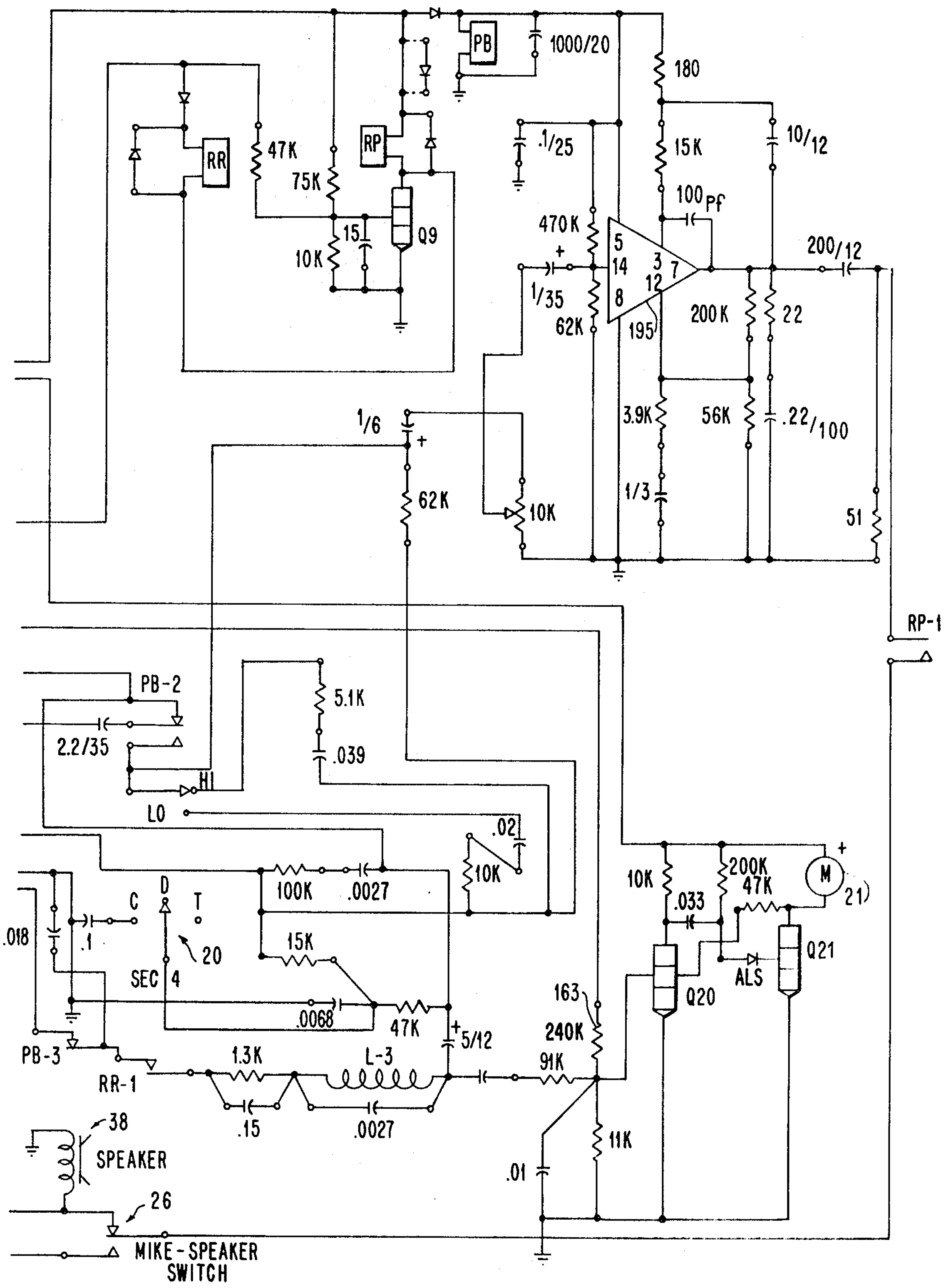

The output of the amplifier stages including transistors Q14, Q15, and Q16 is directed through a network including coil L–3, FIG. 25*e*, through the RR-1 contacts, now closed, the PB–3 contacts and to the lower portion of a Record-Playback winding 82*a* for recording on the magnetic belt 2. A portion of the erase potential developed by transistors Q12 and Q13 is superimposed on the record signal in accordance with recorded signal in accordance with known high frequency biasing techniques. Belt 2 is erased, of course, by the erase signal developed across the lowermost winding 82*b*.

During dictation, the circuits just described may be activated temporarily by a momentary depression of dictate bar 33 whenever material is to be dictated, or for extended periods by depressing dictate bar 33 and latching it under a shoulder in microphone 3 by sliding it to the left, FIG. 1*a*, while simultaneously depressing it.

The relative transverse movement of sound head 82 and belt 2 records a helical sound track on belt 2.

WARNING SIGNALS

As indicated in the outline of dictating operating instructions above, a warning tone may be generated at various times. As an example, closure of the "End of Belt" contacts, FIG. 25*c* completes a circuit from terminal 20 through the contacts, and by line 165 to operate a buzzer 166 that is heard in speaker 38, FIG. 25*e*.

The circuits are arranged to operate buzzer 166 under a number of other circumstances as outlined above. Other examples include depression of the dictate bar when in a telephone mode or moving the record-listen-review switch to the Listen position when in a telephone mode. This is through section 3 of switch assembly 20, FIGS. 25*c*.

If the dictator continues through the "End of Belt" signal location on belt 2, the "Auto-Off" contacts, FIG. 25*c*, are opened by approach of head 82 to the limit of the belt and open the path through the phase 1 contacts and terminal 6 of the accessory connector to prevent further operation until a new belt is inserted, or the sound head is moved away from the end of the belt.

FORWARD SPACING AND BACKSPACING

According to the present invention, the dictating and transcribing apparatus are provided with unique facilities in the form of a symmetrical forward and backspacing mechanism operated by energization of forward and reverse solenoids, when desired. In the case of the dictating unit, the reverse solenoid 89, FIG. 25*b* is energized by movement of the record-listen-review button 32 to the lowest position in FIG. 25*a*. With the structures and circuits provided herein, it is possible for the dictator to review material in the reverse direction, that is, toward the beginning of the dictated material, or in the forward direction, that is, toward the end of dictated material.

Ordinarily, during the course of dictation, the dictator desires to backspace head 82 in relation to belt 2 in order to listen to previously dictated material.

MECHANICAL STRUCTURES FOR FORWARD SPACING AND BACKSPACING

The reader is referred to the various drawings, including FIGS. 4, 5, 10, 12, 13, 14*a*–14*f*, and 17*a* and 17*b* in particular which illustrate various structural components of the forward and reverse (backspacing) structures provided in the equipment.

The incrementing or measured review structures include a pawl assembly 101 illustrated especially in FIGS. 12, 13, 14*a*–14, and 17*a* and 17*b*. The pawl assembly is essentially symmetrical in nature with an upper set of pawls and a lower set of pawls. The activation of the upper and lower sets of pawls is under control of forward solenoid 88 and reverse solenoid 89.

The mechanical structures will be first discussed followed by the electrical circuit action to energize the respective solenoids.

In FIGS. 6, 12 and 13, solenoids 88 and 89 are connected to operate a bail member 170 mounted for pivoting action on rod 171. Bail member 170 is connected by pin 172 to an operating member 173 mounted for reciprocating movement about fixed pin 174. Operation of reverse solenoid 89 moves bail 170 in a counterclockwise direction about rod 171, FIG. 13, and by the connection at 172 rotates operating member 173 in a clockwise direction about rod 174. Connected to operating member 173 is a stepping bail 175 mounted for reciprocating movement indicated by arrow 177, FIG. 13. As shown in FIG. 12, stepping bail 175 is arranged to pass between the upper and lower sets of escapement pawls in assembly 101.

With the arrangement shown in FIG. 13, energization of reverse solenoid 89 operates bail 170 to move stepping bail 175 in such a manner that pawl assembly 101 is operated to effect stepping of magnetic head 82 in a reverse direction with respect to an inserted belt, while energization of forward solenoid 88 operates bail 170 and stepping bail 175 to control operation of pawl assembly 101 for effecting movement of magnetic head 82 in a forward direction with respect to an inserted belt. From previous discussion it will be recalled that home position of head 82 is to the right in FIG. 12, thereby establishing movement of head 82 to the left as a forward scanning movement. Pawl assembly 101 is thereby operated to move the carriage assembly 103 to the left along lead screw 100 for a forward stepping operation and to the right for a reverse stepping operation.

Figure 14A:
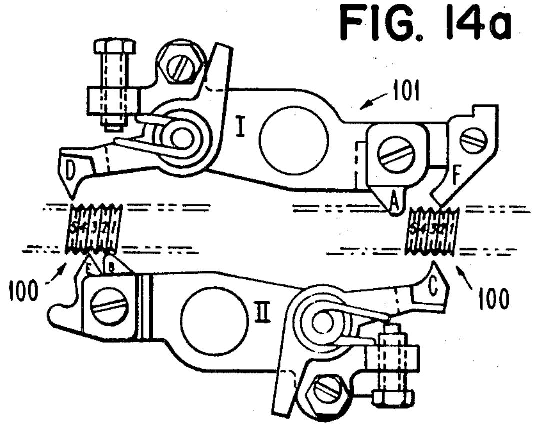
FIGS. 14*a*–14*f* illustrate operation of forward and backspacing (reverse) pawls shown in FIG. 12.
Figure 14D:
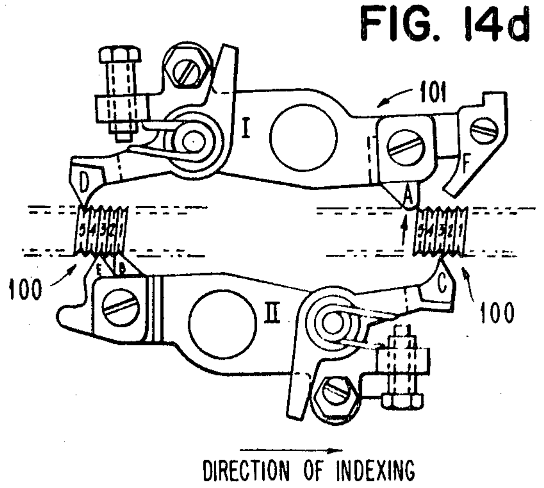
Figure 14B:
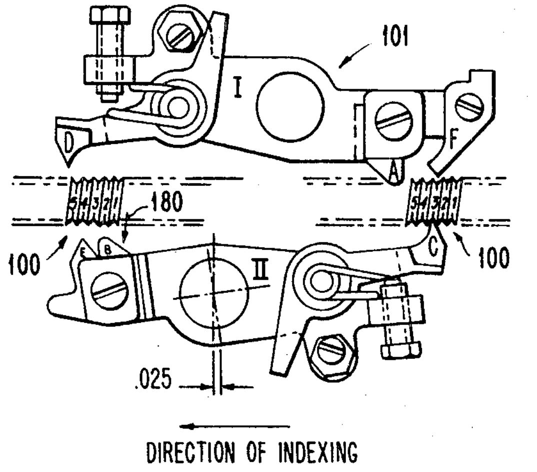
Figure 14E:
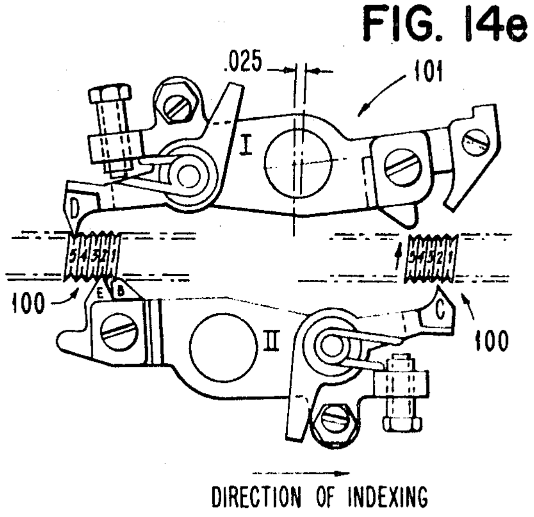
Figure 14C:
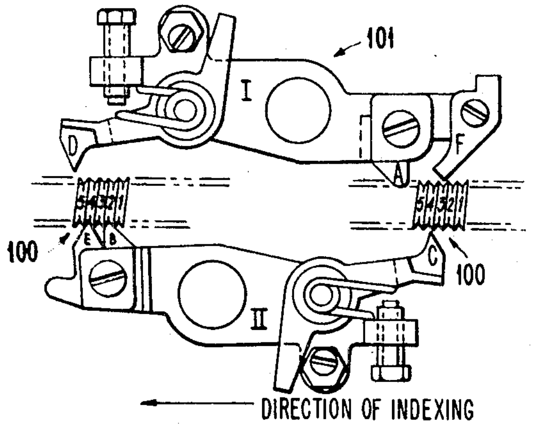

Referring to FIGS. 14*a*–14*f*, stepping bail 175 is arranged to operate during it reciprocating action, under control of either forward solenoid 88 or reverse solenoid 89 against tabs A and B. The normal engaged condition of the pawl assembly 101 is illustrated in FIG. 14*a* where pawl E is engaged with groove 3 in lead screw 100. The sequence of FIGS. 14*a*–14*c* illustrates an indexing or stepping operation of carriage assembly 103 to the left. This requires operation of stepping bail 175 against tab B in pawl assembly 101. Pressure exerted by stepping bail 175 is in a direction indicated by arrow 180, FIG. 14*b*. This pivots assembly II counterclockwise engaging pawl C in groove 3 in the right set of teeth shown for lead screw 100. The rotation of assembly II in such fashion moves the center point of the assembly a distance of 0.025 inches to the left. When stepping bail 175 returns to its normal central position, assembly 101 is moved to the left carrying carriage assembly 103 with it with the interaction of pawl C and lead screw 100 reengaging pawl E with groove 4 of the left set of teeth in lead screw 100.

Figure 14F:
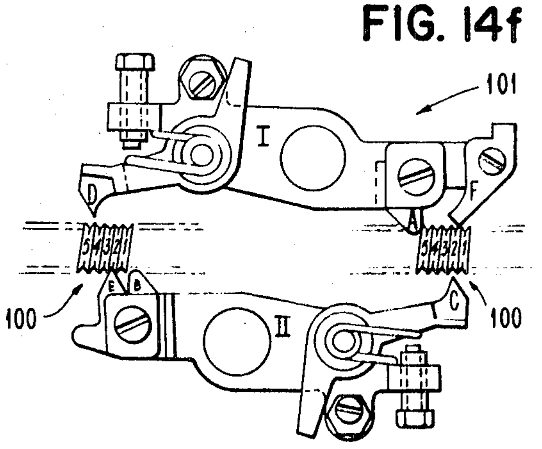

Movement of the pawl assembly 101 and attached carriage 103 to the right is illustrated by the sequence in FIGS. 14*d*–14*f*. Stepping bail 175 is operated in the opposite direction by energization of the appropriate solenoid. Bail 175 acts on tab A, FIG. 14*d* and rotates assembly I to engage pawl D with tooth 5 in the leftmost set on lead screw 100. The normal condition of the stepping assembly is as shown in FIG. 14*a*, as described previously. In FIG. 14*d*, pawl E is engaged with groove 3 in the left portion of lead screw 100. Rotation of assembly I to the position in FIG. 14*e* moves pawl E to the right into engagement with groove 2 of the left set of teeth in lead screw 100. This is due to interconnection of assembly I with carrier 103 which in turn acts to move assembly II.

When stepping bail 175 is returned to its normal central location with respect to the pawl assembly 101, pawl E remains engaged with groove 2 in lead screw 100. Tab A and associated assembly I returns to the rest position in readiness for another indexing operation in the direction indicated.

MANUAL RETRACTION OF PAWL ASSEMBLY 101

The manual retraction of pawl assembly 101 was previously alluded to in connection with operation of scanning knob 16, FIGS. 1 and 12. More specifically, operation of scanning knob 16 moves pawl retract bail 87 and by interconnection shown in FIGS. 17*a* and 17*b* operates retractor 183 in a downward direction. Retractor 183 is connected at 184 with a retractor driver 185 that is rotated from the condition shown in FIGS. 17*a* to that shown in FIGS. 17*b*. Such rotation of retractor driver 185 moves retractor 186 upwardly to retract assembly 1 from lead screw 100.

To summarize, movement of pawl retract bail 87 from the normal position in FIG. 17*a* to the activated position in 17*b* retractor 183 downwardly and retractor 186 upwardly to disengage all pawls from lead screw 100. The actual disengagement is effected by extensions 183*a* and 183*b* of retractor 183 and 186*a* and 186*b* of retractor 186.

CIRCUIT ACTION FOR REVERSE AND FORWARD STEPPING

When he desires to listen to previously dictated material, the dictator normally moves record-listen-review button 32 on microphone 3 downwardly to the review position. Button 32 is movable to any of the three positions (upper, center, or lower), will assume an upper or center position if so placed, but is biased in such a manner that it must be held in the lower position, for the length of time desired. A momentary movement of button 32 to the lower position will result in a single actuation of reverse solenoid 89. An optional feature may provide for in a repeated energization of reverse solenoid 89 and a repeated measured review or indexing action in the reverse direction.

Assuming a single actuation of button 32 to the lower position, the circuit action is as follows. In the right center of FIG. 25c, terminal 7 of the accessory connector is at ground potential. From ground it continues to the H slide contact of the leftmost set of contacts associated with button 32, through the switch slider, slide contact Z, terminals 8 of the accessory connector and through Phase 2 contacts to the base of transistor Q23. This biases transistor Q23 on and by circuit connection from FIG. 25c to 25b energizes reverse solenoid 89. The energization of transistor Q23 is primarily under control of a 10/20 capacitor (10 μfd. at 20 v. DC) in the base circuit that is charged and saturates the transistor. As an option, not shown, a charging-discharging circuit may be provided for transistor Q23 which operates according to a predetermined timing cycle. Accordingly, even though button 32 on microphone 32 remains depressed to the lower position, the timing circuit turns transistor Q23 on and off to operate reverse solenoid 89 in a repeated cyclical fashion. The dictator is also able to review material in the forward direction by movement of button 38 upwardly. Such movement connects switch H. FIG. 25a, through the switch slider to switch G, by terminals 18 of the accessory connector and to the base of transistor Q22 that is connected for operating Forward solenoid 88. An optional capacitor charging-discharging circuit, not shown, may be provided for transistor Q23. Then, a single actuation of button 38 upwardly will energize Forward solenoid once. Holding button 38 into contact with switch G connection will result in a repeated energization of Forward solenoid 88 and a repeated stepping of the carriage in a forward direction. A spring bias is also maintained on button 38 to return it to the normal inactive or center location shown in FIGS. 1a and 25a.

OPTIONAL FEATURES, INCLUDING RAPID SOUND HEAD ALIGNMENT AND LEFT MARGIN CONTROL

Provision is made for incorporating several optional features in the apparatus that, under some circumstances, insure a greater degree of accuracy with respect to sound head alignment in relation to the belt and operation of the sound head in the left margin area, that is, the home position of sound head 82.

RAPID SOUND HEAD ALIGNMENT

During a manual scan operation, wherein pawl retract bail 87, FIG. 17b, is retracted to disengage pawl assembly 101 from lead screw 100, it is sometimes difficult to reengage the pawls in exact alignment with the teeth in lead screw 100, upon assuming a new position of sound head 82 in relation to belt 2. The structures shown in FIGS. 20, 21a, and 21b provide for a rapid alignment of sound head 82 in relation to belt 2 following such an operation.

Until the carriage repositions itself, the helical path recorded on belt 2 during the recording operation may not be perfectly followed, resulting in cross-talk and less desirable reproduction of the recording.

Figures 20, 21A, 21B, 22, 23, 24:
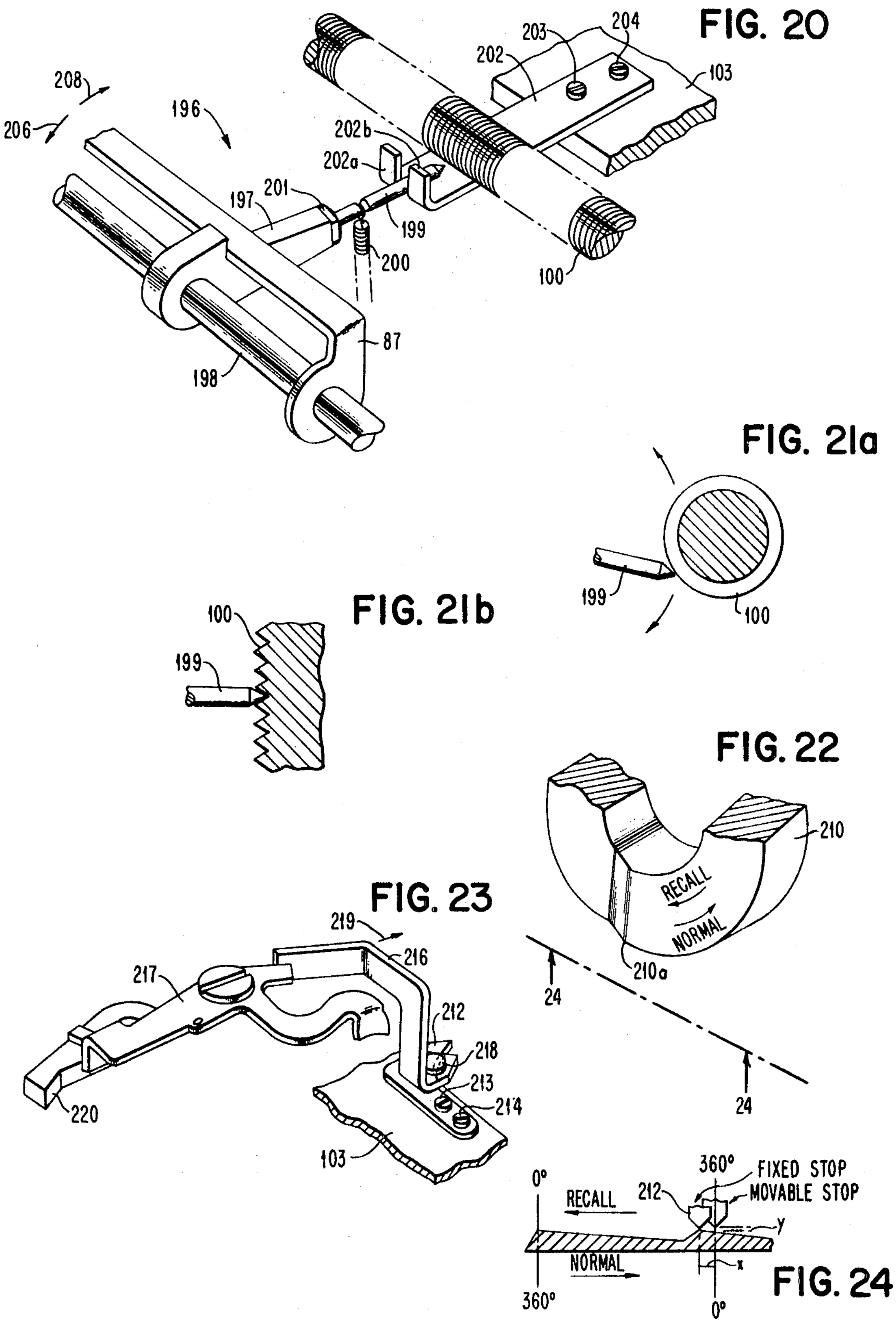
FIGS. 20, 21*a*, and 21*b* illustrate optional mechanisms concerned with rapidly aligning the sound head in relation to the driving lead screw in either the dictating unit of FIg. 1 or the transcribing unit of FIG. 15 following a manual scanning operation.
FIGS. 22, 23, and 24 illustrate various mechanisms associated with a margin control to insure that the transcriber can hear all of the dictated material, particularly near the initial home margin of the magnetic belt of FIG. 3.

In FIG. 20, pawl retract bail 87 operates an alignment assembly 196 that includes a support member 197 mounted for rotation on shaft 198. Support member 197 carries a rapid alignment pointer or probe 199 that is spring loaded by spring 200, with considerable tension. Probe 199 is adjusted by adjusting screw 201 to a predetermined relationship with respect to lead screw 100, FIG. 21b. Sound head carriage 103 carries a bracket or comb assembly 202 that is adjustable by screws 203 and 204 in relation to pointer 199. Comb assembly 202 has extensions 202a and 200b that form a groove for reciprocation of probe 199.

In operation, pawl retract bail 87 is moved in a direction indicated by arrow 206 to disengage pawl assembly 101 from lead screw 100. This action rotates support member 197 counterclockwise in FIG. 20 and moves probe 199 up above lead screw 100. When scanning lever 16 is released so that retract bail 87 can restore in a direction indicated by arrow 208 and reengage pawl assembly 101 in lead screw 100, probe 199 is rapidly pulled downwardly by action of spring 200 into and through a tooth in lead screw 100, FIG. 21a. Due to the coaction of the pointer portion of probe 199 with the groove in lead screw 100, probe 199 reacts against extensions 202a or 202b and through the interconnection of comb 202 with carriage 103 moves carriage 103 slightly, as required, into accurate alignment with respect to lead screw 100.

MARGIN CONTROL

Another optional feature for use with the dictation or transcribing apparatus according to the present invention concerns margin control structures illustrated in FIGS. 23, 24, and 25. Lead screw 100 carries a margin cam 210 having a helical face with a lead equal to the lead screw. Cam 210 is positioned radially so that its high point at 210a is just beyond zero degrees of the lead screw as required by the initial phasing operation, previously described.

The objective of the structures in FIGS. 22, 23, and 24 is to enable the restoration of sound head 82 at a point slightly past the original initial margin area on belt 2 to insure that previously recorded material is picked up in its entirety. Cam member 210 prevents unintended recording prior to the predetermined margin location, but does permit backspacing or recall operation into this area for the purpose of playback.

In FIG. 23, the device includes an adjustable stop element 212 that is fixed to sound head carriage 103 by screws 213 and 214. Prior to a belt loading operation, head 182 is restored to the margin until the fixed adjustable stop 212 contacts margin cam 210. The stop 212 is adjusted so that the stepping pawls in assembly 101, FIGS. 14a–14f, are aligned with the lead screw. During operation of the initial phasing system, lead screw 100 is rotated to zero degrees and cam 210 positions head carrier 103 to the predetermined margin location. The stepping pawls in pawl assembly 101 are disengaged until the phasing operation has been terminated.

To enable sound head 82 to be positioned prior to the normal left margin used during recording, cam 210 is rotated to present a lower dwell to the fixed stop 212 thereby enabling movement of sound head 82 beyond the normal margin to insure reproduction of all of the previously dictated material, FIGS. 22 and 24.

Under some conditions, such as a recall operation, to be described, a recall pawl lift 216 is operated by another pawl element 217 to rotate about stud 218 in a direction indicated by arrow 219 and encounters cam 210 instead of the fixed stop 212. This prevents the fixed stop 212 from being driven into margin cam 210 as when the lead screw is reversed during a recall operation. Pawl 217 is rotated by movement of backspace pawl 220 that is also used for a reverse scan operation. As pictured in the drawings, carriage 103 with stop 212, FIG. 23, moves toward margin cam 210 in FIG. 22.

The relationships of the structure as such that fixed stop 212 encounters cam 210 at the high point of the cam face under normal circumstances. During a playback operation when it is desired to begin reproduction past or prior to the margin used during recording, cam 210 is rotated in a direction indicated by the "Recall" arrows thereby positioning a different portion of face cam 210 for cooperation with stop 212 and enabling stop 212 together with associated carriage 103 to move further and prior to the recorded margin.

OPERATION OF INDEXING MECHANISMS FOR SUPPLYING END OF LETTER AND SECRETARY INSTRUCTION INDICATIONS

Scanning lever 16 houses a printing index marking assembly such as that described in U.S. Pat. No. 3,203,000, noted in the "Cross Reference" section. Due to the mechanical interconnections shown in FIG. 12, scanning lever 16 is moved adjacent an uppermost index slip 15, FIG. 1, in synchronism with the movement of magnetic head 82 adjacent an inserted belt 2. The relative location of scanning assembly 16 with respect to index slip 15 is taken advantage of to provide end of letter and secretary instruction indications by operation of the marking device contained therein. Such device is actuated to supply end of letter indications in an upper row of index slip 15 and secretary instruction indications in a lower row of index slip 15. The assembly includes a letter (LTR) solenoid 190 and a Secretary (SEC) 191 shown in FIG. 25*b*. These solenoids are appropriately activated by movement of the letter-secretary button 39 FIGS. 1, 1*a*, and 25*a*, to the upper position (letter) or the lower position (secretary instruction).

During the course of dictation, potential is supplied to the dictating circuits by the previously discussed path to terminal 6, FIG. 25*a* and thence to the lower switch section D of switch assembly 39 for connection to the letter switch section E or the secretary switch section F. Movement of the index button 39 upwardly connects potential from terminal D to E and by terminals 28 in the accessory connector operates letter solenoid 190 to effect the marking of index slip 15. Movement of the index button downwardly connects D to F and by terminals 30 in the accessory connector operates the secretary solenoid 191.

PLAYBACK (LISTEN) MODE

The playback (listen) mode is established by positioning of the record-listen-review button 32 to the center position on microphone 3.

Movement of button 32 to the center position operates the playback (PB) relay and the associated (PB) relay, FIG. 25*e*. The circuit is as follows. Potential from terminal 6, FIG. 25*a*, through switch connection C of the right switch section operated by button 32, connection M, a circuit connection to terminals 11 of the accessory connector to section 3 of switch assembly 20, FIG. 25*c*, and by wiring to the upper end of the playback PB relay and the RP relay, FIG. 25*e*. The playback relay has contacts associated with it and designated PB–1 through PB–4. The energization of the playback relay transfers all of the relay contacts noted. The transfer of contact PB–1 disconnects microphone 36 from head winding 82*a*, FIG. 25*c* and connects the entire winding to the input of transistor Q14. Contacts PB–2, in transferring, disconnect the output of transistor Q16 from the previously outlined recording circuit through coil L–3 and connects the output instead by an apparent circuit to an integrated amplifying circuit 195, FIG. 25*e*. The output of integrated circuit 195 is directed through the RP–1 contacts, now closed due to the energization of the associated RP relay, and directed to speaker 38 if the microphone-speaker switch 26 is positioned as shown. Otherwise, the output of circuit 195 passes through accessory connector terminals 27 to speaker 37 in microphone 3. Contacts PB–3 disconnect the previously existing recording circuit to head winding 82*a*. Contacts PB–4 change the feedback network around transistors Q14 and Q15 to optimize record and playback frequency response.

It should be noted at this time that the RP relay reacts somewhat more slowly than the playback PB relay and closure of contacts RP–1 occurs somewhat later than the transfer of the various playback contacts, thereby eliminating undesirable clicks in speaker 38 resulting from transients in the circuit that otherwise might occur.

Motor 105 is energized in a fairly continuous manner throughout a playback mode of operation. The circuit is from terminal 6, FIG. 25*a*, connection C of the left-most switch section operated by button 32 through the slider, connection L of the leftmost section, terminals 12 of the accessory connector, phase 4 contacts, and the motor circuit as previously described.

With battery, a circuit exists from terminal 12 of the accessory connector to transistor Q10. On AC machines, potential for transistors Q14, Q15, and Q16 is provided from the 150Ω/1 watt resistor and Zener diode, as during a Record operation. This also drives transistor Q11 for regulating the potential provided to the motor control with transistors Q2–Q8.

SEMI-AUTOMATIC ERASE

The apparatus is equipped with mechanisms for erasing a magnetic belt in its entirety, whenever desired by the operation of the equipment. In one form, the erase structure includes the erase button 40, FIGS. 1, 4, and 5 and a pivotally mounted magnet structure 156 that is manually moved toward the magnetic belt, when inserted in the machine and held against the belt while the motor drives the belt past the magnet. The structure includes a permanent magnet 157 that extends coextensively with the transverse width of the belt and that effectively restores the belt to a neutral condition for subsequent recording operations. This is similar to the erasing operation described in the IBM Customer Engineering Instruction and Reference Manuals in the "Other References" section.

In another form, the magnetic assembly 156 is moved toward the magnetic belt as in the first structure but is provided with latching means, not shown, to retain the structure against the belt even though button 40 is only temporarily operated. In this version, movement of the magnetic structure operates contact assembly 158, FIG. 4, to provide a circuit connection for driving the motor at high speeds. The structure is arranged in such a manner that at least one revolution of the entire belt is accomplished past permanent magnet 157, whereupon unlatching means, not shown, is operative to restore the magnet structure 156 to the normal inactive condition. The reader is referred to FIG. 27*a* which shows several contact straps designated auto-erase AE–1 and AE–2 that are transferred by movement of the erase structure to accomplish the erase operation.

CONFERENCE MODE

The dictating apparatus may be used for recording conferences involving a large number of people by positioning microphone 3 for best signal pickup and by increasing signal levels in the recording circuits. Mode knob 20 is moved to the leftmost position, FIG. 1, to condition the apparatus for a conference mode of operation. Mode switch 20 has 4 sections with sections 1, 2, and 3 shown in FIG. 25*c* and section 4 shown in FIG. 25*e*. Section 2, when in the conference (left) position bypasses the 1 K ohm potentiometer directly above the switch section that is normally used in a dictate mode, thereby increasing signal strength. The circuit connections of sections 1 and 3 are essentially unchanged by movement of switch 20 to the conference position. Section 4 in FIG. 25*e*, alters the amplifier circuit for additional signal strength.

TELEPHONE MODE

Movement of switch 20 to the right position, FIG. 1, places the apparatus in condition for telephone recording operations. Input to the system is by "audio" and "power" lines related to the telephone recording attachment (TRA) shown at the bottom of FIG. 25*a*. The audio input passes through terminals 2 of the accessory connector and through the rightmost connection of section 2 of mode switch 20 FIG. 25*c*, to amplifier transistors Q14, Q15, and Q16. Power is supplied to the telephone recording attachment from terminal 6 and the rightmost connection of section 1 of switch assembly 20 by terminal 17 of the accessory connector for routing to the various machine circuits.

DICTATOR LOGIC

Figure 29:
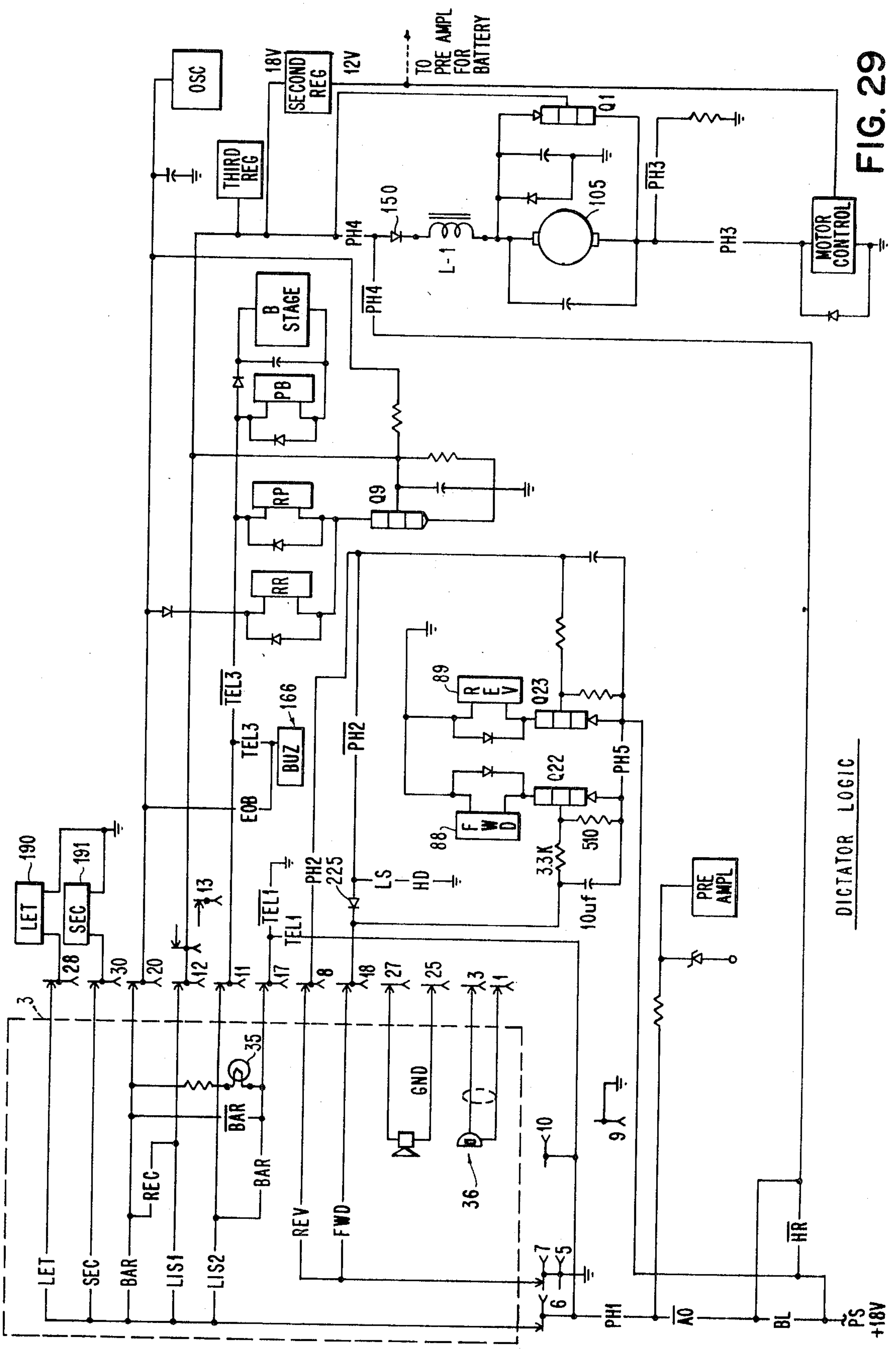
FIG. 29 is a simplified logic diagram of circuit actions in the dictating unit of FIG. 1 and particularly the circuits of FIGS. 25*a*–25*b*[.

The detailed circuits for the dictating unit shown in FIGS. 25*a*–25 are somewhat simplified in the logic diagram of FIG. 29. Only the major components involved in operation of the dictator unit are shown in FIG. 29. These include microphone 3 shown in the dashed box so designated and various interconnecting terminals that correspond to the accessory connector shown in FIG. 25*b*. A complete sequence of operations of the dictator unit will clarify the logic involved.

In FIG. 29, loading of a magnetic belt in the unit closes the belt load contacts (BL). This completes a circuit from the Power Source (PS) through the Not Head Restore ($\overline{HR}$) and Not Phase 4 ($\overline{PH4}$) contacts to drive motor 105. Mechanisms associated with belt loading are latched to prevent dictation until the lead screw has reached a zero phased condition and the aperture 2*a*, FIG. 2, in belt 2 is sensed by the apparatus. The latching mechanism is released by operation of reverse solenoid 89 that is driven by transistor Q23. Rotation of lead screw 100 to a zero condition closes Lead Screw contacts (LS). Sensing of aperture 2*a* in belt 2 closes the Hole Detect (HD) contacts. A circuit to ground is thereby completed through the LS and HD contacts, through Not phase 2 to the base of transistor Q23 to saturate it and energize reverse solenoid 89 to release the latching mechanism and indicate that the phasing operation has been completed.

A dictate mode is established by positioning of mode knob and switch assembly 20 to the center of dictate position which prepares the logic for recognition of the Record (REC) status. Mode control button 32 on microphone 3 is also moved to the upper or record position to prepare the machine circuits for recording of dictation. When the operator of the unit desires to dictate, he depresses dictate bar 33 that completes a number of circuits as follows. A circuit exists from Power Supply PS through belt load BL contacts, Not auto-off $\overline{AO}$, through phase 1 PH1, Connector 6, Dictate Bar (BAR), and thence to several circuits in FIG. 29.

Power is applied through connector 20 to pick relay RR that completes a circuit to the magnetic head for recording signals. This also activates the oscillator for bias and erase signals.

A parallel circuit exists through the record REC logic, connector 12 to the base of transistor Q9 in connection with energizing relay RR and also to the top of motor 105 through phase 4 PH4 contacts, diode 150, and coil L–1 for driving belt and head mechanisms to trace a helical path on belt 2.

During dictation, movement of the letter-secretary button 39 to the Letter position (LET), energizes the letter solenoid 190 to mark a letter indication on index slip 15. Movement of button 39 to the lower position closes secretary SEC contacts to operate the secretary solenoid 191, thereby making a secretary instruction mark on index slip 15.

During dictation, the fact that the equipment is in a record mode is indicated by the energization of lamp 35 on microphone 3.

If it is desired to review material previously dictated, the dictator moves mode button 32, FIG. 1*a*, to the lowest position against the spring bias which closes a connection to ground through connectors 5 and 7, the Review switches (REV), connector 8, phase 2 contacts PH2 to transistor Q23 to energize the reverse solenoid 89 and backstep head 82. Optionally, a repeated backstepping may be obtained by continued depression of button 32 to the review position.

Stepping of head 82 forwardly in relation to belt 2 is accomplished by movement of button 38 on microphone 3 to the upper position. This completes logic through the Forward (FWD) contacts), connection 18, to the base of transistor Q22 for energizing forward solenoid 88.

The signals during recording are provided from microphone transducer 36 to the machine amplifier circuits from terminals 1 and 3.

In order to listen to previously dictated material, the dictator moves mode button 32 to the center position which operates Listen (LIS) logic. Closure of the Listen contacts LIS 1 and LIS 2 completes several circuits. The circuit from LIS 1 through connector 12 biases transistor Q9 on to activate motor circuit transistors Q2–Q8, the second regulator, and energize motor 105. Another circuit activates playback relay PR, relay RP, the power amplifier (B stage), through Not Telephone 3 ($\overline{TEL\ 3}$), connector 11, and Listen 2 LIS 2.

With battery, power for the preamplifier is supplied from the third regulator stage and controlled by switch LIS 1. With AC, power comes from the $\overline{AO}$ contact.

During the operation of motor 105, regulation is provided by the motor control block under control of the second regulator block. A third regulator circuit is also provided.

Dynamic braking is provided by transistor Q1 which conducts upper termination of dictation and listening and that serves as an effective short circuit across motor 105 to bring motor 105 rapidly to a standby condition. During dictation, the preamplifier stages (PRE-AMPL) are activated from the Not Automatic Off connection ($\overline{AO}$). During a listen mode, the connection to the oscillator is effectively open since dictate bar 33 is not depressed.

The logic includes buzzer 166 that is operated as an example by the End of Belt (EOB) contact.

DICTATOR UNIT WITH FOOT CONTROL

As another optional feature, the apparatus described herein offers a foot control accessory for use by a dictator to control various operations in the equipment by appropriate movement of the foot. The foot control circuits are shown particularly in FIG. 25*b* and the logic in FIG. 30. Connection of the foot control connector to various input terminals of the accessory connector in FIG. 25*b* disconnects the corresponding control elements in microphone 3, FIG. 25*a*.

Use of the foot control is concerned primarily with a playback mode of operation. In appearance, it may resemble foot control 8, FIG. 15, that is associated with transcriber unit 5. Because of the structural similarity, the foot control is designated 8*a* in FIGS. 25*b* and 30. Such structure normally contemplates a treadle that is movable in different directions by foot pressure to open and close various switches for controlling operation of the equipment. For illustrative purposes, it is assumed that depression of the right side of the foot control 8 closes switches 1 and 2 ($\overline{SW1}$ and $\overline{SW2}$) and establishes a playback or listen mode of operation. Depression of the left side of the foot control establishes a reverse incrementing or measured review operation, while depression of the top portion of the foot control institutes a forward stepping or incrementing operation.

Figure 30:
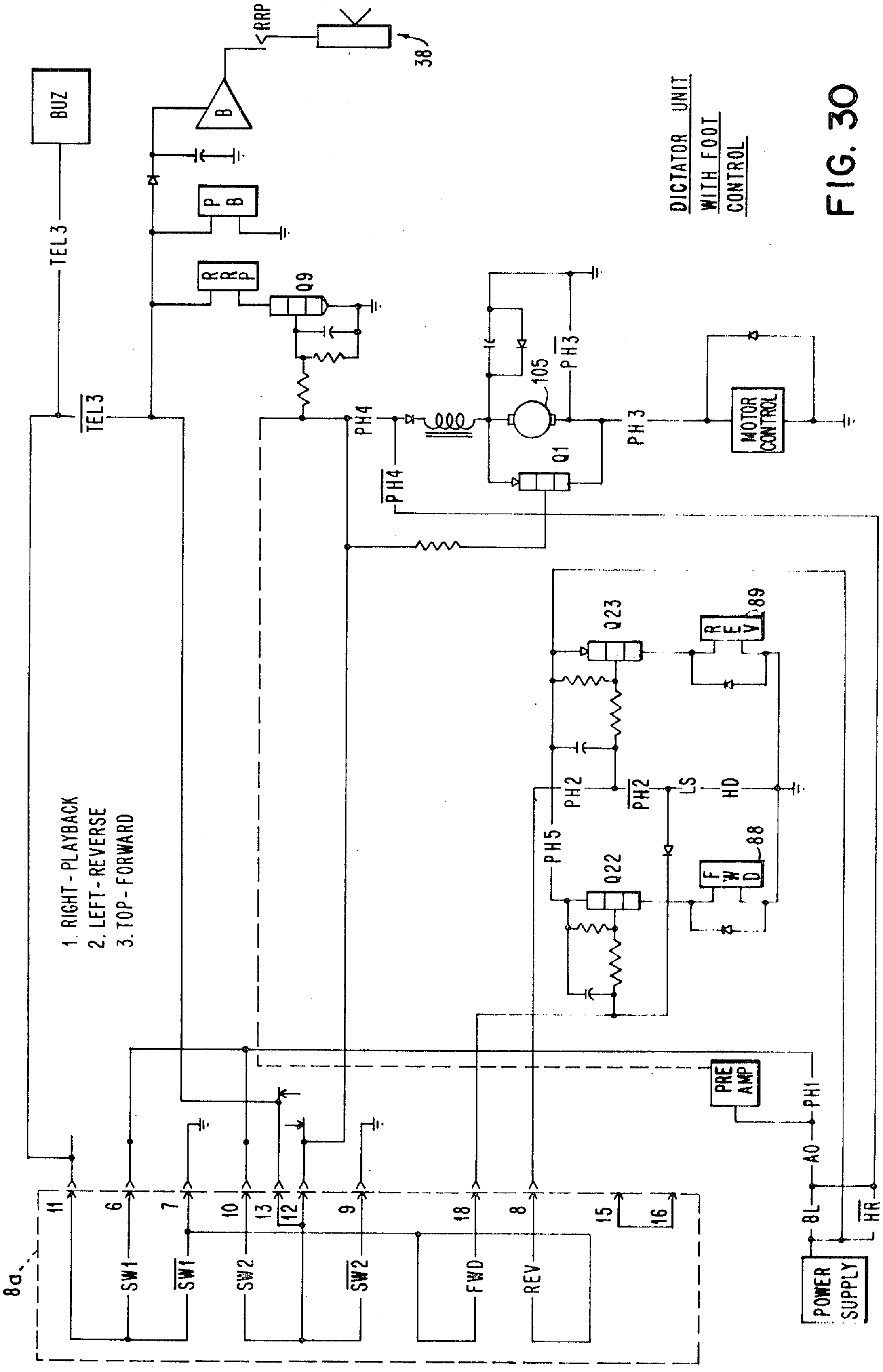
FIG. 30 is a similar diagram for a dictating unit with foot control.

A discussion of the logic in FIG. 30 is believed to suffice for operation of foot control 8*a*.

When not operated, the switch 1 and 2 contact assemblies are as shown in FIG. 25*b*, which indicates a Not Switch 1 and Not Switch 2 ($\overline{SW1}$ and $\overline{SW2}$) condition. Not SW1 grounds the buzzer and various circuitry including a PB relay and an RRP RP relay. Not SW2 grounds the top connection to motor 105 rendering it inactive.

Potential from the power supply is applied through the belt load BL contacts, and auto-off AO to activate the preamplifier circuits that correspond to transistors Q14, Q15 and Q16. A dashed line battery connection is provided to the base of transistor Q9, in which case $\overline{AO}$ is removed.

When a belt has been loaded in the unit and properly phased, the phase 1 PH contacts supply power to terminal 6 of foot control 8*a*.

To initiate operations for listening to previously dictated material, the operator depresses the right side of foot control 8*a*. This transfers the switch 1 and switch 2 contacts SW1 and SW2 to complete several circuits. The SW1 contacts through terminal 11 together with Not Telephone 3 ($\overline{TEL\ 3}$) provides potential to energize the PB and the RRP RP relays, as well as the integrated circuit for the B stage of the unit. The RRP contacts complete a circuit to speaker 38. The switch 2 contacts provide potential through terminal 12 to the upper circuit connection of motor 105, thereby activating the motor for relatively driving the magnetic belt and magnetic head to sense recorded material.

A reverse scanning operation is effected by release of foot control 8*a* and depression of the left portion of the foot control. This connects ground from terminal 7 through the reverse contacts in the foot control to the base of transistor Q23 for energizing the reverse solenoid 89.

A forward scanning operation is accomplished by depressing the top portion of foot control 8*a* which applies ground from terminal 7 to the base of transistor Q22 thereby energizing forward solenoid 88.

Motor control regulation and dynamic braking (the latter under control of transistor Q1) is provided as in the regular dictator unit.

TRANSCRIBING UNIT

General Description

In accordance with the present invention, a transcribing unit is provided that makes use of essentially the same basic belt record media handling, loading, ejecting, and phasing mechanisms as are used in the dictating unit with the exception that the mechanisms are oriented to face the transcriber during normal operation for easier loading and unloading operations. The transcriber unit is pictured in FIG. 15. Various mechanisms concerned with belt loading and unloading, phasing, reverse and forward scanning and other mechanisms are shown in FIGS. 16, 17*a* and 17*b*, and 19. Additional mechanisms concerned with a word recall operation are specifically shown in FIGS. 16, 18, and 19.

As with transcribing units in the prior art, the primary objective of the transcribing unit according to the present invention is to facilitate the transcription of previously recorded media. Operating instructions for the unit are set forth below.

TRANSCRIBING UNIT OPERATING INSTRUCTIONS

Loading Belt

1. The belt 2 is placed on the machine by sliding it over the mandrel 11 with the arrows pointing toward the machine. The belt is inserted into the machine as far as it will go without forcing it.
2. The belt release lever 10*b* is moved to the left to load the belt. Thereafter, the belt rotates at high speed. When it stops it is automatically phased.

Removing Belt

1. Belt release lever 10*b* is moved to the right. The belt will partially extend from the machine at this time.
2. The belt is then manually removed from the machine. Scanner lever 16*a* automatically returns to the left margin.

Index Slip Loading and Removal

1. The index slip 15*a* is inserted into the holder 13*a*.
2. The slip is slid out of the holder for removal.

HEADSET

Removing

1. The operator grasps and pulls headset 14 out of the unit a convenient distance. Tension is released on the headset cable allowing the cord to lock into position. (Note the Dyar, et al., patent application.)
2. The earpieces are twisted sideways until they snap into an expanded condition.
3. The earpieces are spread apart to put the headset on.

Replacing

1. The earpieces are pushed together.
2. The earpieces are twisted until they snap into their rest position or until they lie side by side.
3. The headset is held securely in one hand. The rewind button 30*a* is depressed to retract the headset cable.
4. The headset is guided into the storage compartment.
5. The rewind button 30*a* is released.

FOOT CONTROL

Operating

1. Start-stop. The right side of the foot control 8 starts the machine when depressed. The machine stops when the right side is released.
2. Review. When the left side of foot control 8 is depressed, the sound head is moved back approximately 10 words or 6 seconds of recording time when the recording time selector 27*a* is in the 10 minute position. With an optional feature, holding the left side depressed moves the sound head back continuously in 6 second increments, thus giving an extended review. If the recording time selector 27*a* is in the 20 minute position, the measured review will be 12 seconds or approximately 20 words. For most dictating and transcribing, the switch is in the 10 minute position.
3. Forward Review. Depression of the top of foot control 8 moves the sound head forward approximately 10 words or 6 seconds. With an optional feature, keeping the foot control depressed causes the sound head to advance continuously in 6 second increments. If recording time selector 27*a* is in the 20 minute position, the forward movement will be in 12 second increments or approximately 20 words.

Unit Operating Controls

1. Tuning Control. Tuning control 17 is not normally used. This control is provided so that belts recorded on other dictating equipment can be transcribed on the present transcriber. If a belt without an initial phasing aperture is placed in the transcriber, the automatic initial tuning feature is not operative. The belt will continue to rotate, but is stopped by tapping the forward review (top) portion of the foot control. Manual tuning can now be accomplished by moving tuning control 17 left or right.
2. Automatic Word Recall. Releasing the right side of foot control 8 activates the auto recall mechanism. This allows the last few words of dictation to be repeated the next time the right side of the foot control is depressed. The amount of recall is adjustable from: No recall to about five words. This feature is adjusted to the amount of recall desired by moving recall lever 19 left or right. The panel is marked in seconds from 0–5 seconds.
3. Scanner Lever. Scanner lever 16*a* is provided to allow manual location of the sound head to any position on the belt. Any portion of the recorded information can be reached by pushing the lever toward the machine and sliding left or right. If the right side of foot control 8 is depressed when moving the scanner lever, the transcriber can at the same time listen to what is recorded on the belt. If scanner lever 16*a* is moved, either manually or by depressing the forward review position of the foot control, to the far right of the index slip area, the transcriber will automatically shut off. The unit is turned back on by manually moving the scanner lever to the left.
4. Speed Control. The playback speed is adjusted by speed control knob 22, which is rotated left or right for adjustment. The speed is decreased by turning it to the left and increased when turned to the right. The dot in the center of the control indicates the middle of the speed range.
5. Tone Control. The tone can be adjusted by control 29. The dot in the center of this control indicates the middle of the range.
6. Volume Control. Volume control 31 varies the loudness of the dictation heard through headset 14. The dot on the knob represents the middle of the volume range.

Erasing the Belt

The erase knob 40*a* is used to initiate complete erasure of the entire belt after it has been transcribed. This feature is semiautomatic. Once the knob has been depressed, it latches into position, and as soon as the belt has been completely erased, returns to its normal position. The machine stops to indicate the belt has been erased.

Headset

Headset 14 is positioned for storage in compartment 34 of transcribing unit 5. As described in the Dyar, et al., patent application indicated in the "Cross Reference" section above, headset 14 is collapsible for storage in unit 5 and when withdrawn from the unit is expandable for normal use by the transcriber.

PREPARATION FOR BELT LOADING AND PHASING

Following removal of a previous magnetic belt 2 from unit 5, the sound head in unit is restored to the home margin in a manner similar to that described in connection with the dictation unit. This is effected by engagement of sound head 82 with restore lead screw 95, FIG. 19, and the application of power from transistor T8 through the not head restore $\overline{HR}$ contacts to the motor through the not phase 1 $\overline{PH-1}$ contacts.

Figure 15:
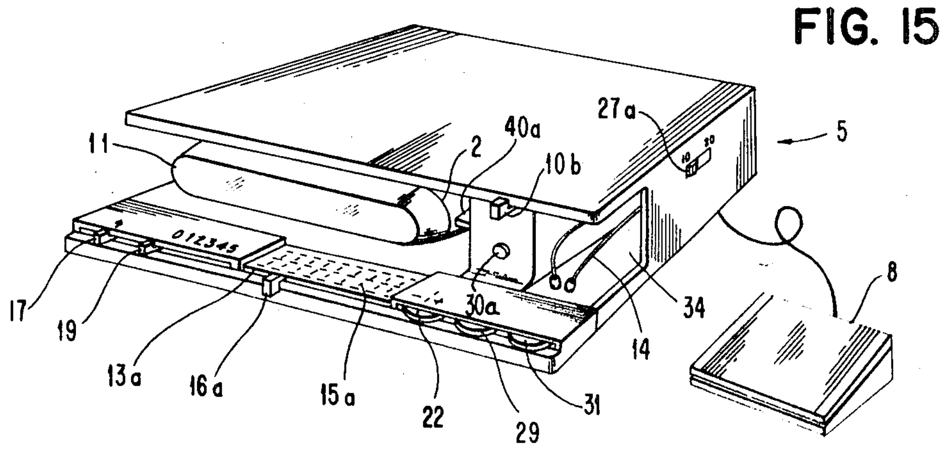
FIG. 15 illustrates a transcribing unit with provision for loading and unloading a belt record media from the front and having an associated headset and foot control.

Normally, the transcriber selects an index slip 15*a* that is related to the belt to be transcribed and positions it in the index retainer 13*a*, FIG. 15. Another belt 2 is then slipped onto mandrel 11 into the transcribing unit as far as it will go. Thereafter, belt lever 10*b* is moved to the left and belt 2 is pulled into unit 5 on drive rollers, such as drive roller 63, FIG. 19, by a gripper assembly such as that described in connection with FIGS. 8 and 9*a*–9*d*. Movement of belt lever 10*b* to the left latches various belt loading and phasing mechanisms and applies power to the motor in the unit to rotate lead screw 100 and belt 2. Member 84 is latched by latch member 91, FIG. 19, and clutch 93 is engaged to drive lead screw 100. As soon as lead screw 100 reaches a zero phase condition as reflected by pin 92 contacting member 84, clutch 93 is disconnected. Belt 2 continues to drive until aperture 2*a* is sensed by contact assembly 97. Rotation of lead screw 100 to the zero phase condition closes the lead screw contacts LS–1, while detection of aperture 2*a* closes the hole detect HD–1 contacts, FIG. 27*a*. A circuit is thereupon completed to energize transistor T2 and actuate forward magnet 89*a* to release the mechanisms previously latched which includes release of member 86 and transfer of the Phase contacts to the condition shown in FIG. 27*a*, thereby indicating that the lead screw and belt have been phased to a proper initial position. The unit is thereupon ready for use by the operator and control by appropriate movement of foot control 8.

As indicated in the operating instructions, compatibility of the unit for operation with magnetic belt media having no aperture is achieved by insertion of such media in the unit and depression of foot control 8 to close switches in order to activate reverse solenoid 89*a* thereby unlatching the loading and phasing mechanisms and preparing the unit for use.

TYPICAL TRANSCRIBING OPERATION

To transcribe an inserted belt in unit 5, the operator positions headset 14 for listening to signals derived during Playback and positions foot control 8 for appropriate depression in the various directions indicated. Depression of the right side of the foot control transfers switches 1 and 2 within the foot control to apply power to the various machine circuits. Power is provided from transistor T8 through the belt load BL–1 contacts, phase 1 contacts, automatic-off AO–1 contacts, connector 6 in the foot control to the lower strap of playback switch contact 1 in foot control 8. Such transfer applies the power supply potential, which is a nominal 16.0 volts from terminal 6 through the lower set of contacts in switch 1, by terminal 11 and completes a circuit to relay R operated by transistor T4. Relay R is held through its own R–1 contacts and a set of timer contacts TC that are significant in the Automatic Recall operation to be described. Also, the transfer of switch contacts 1 close a circuit for energizing relay RR through transistor T5. The RR–1 contacts complete the amplifier circuit to the headset, FIG. 27*b*.

Figures 27A, 28:
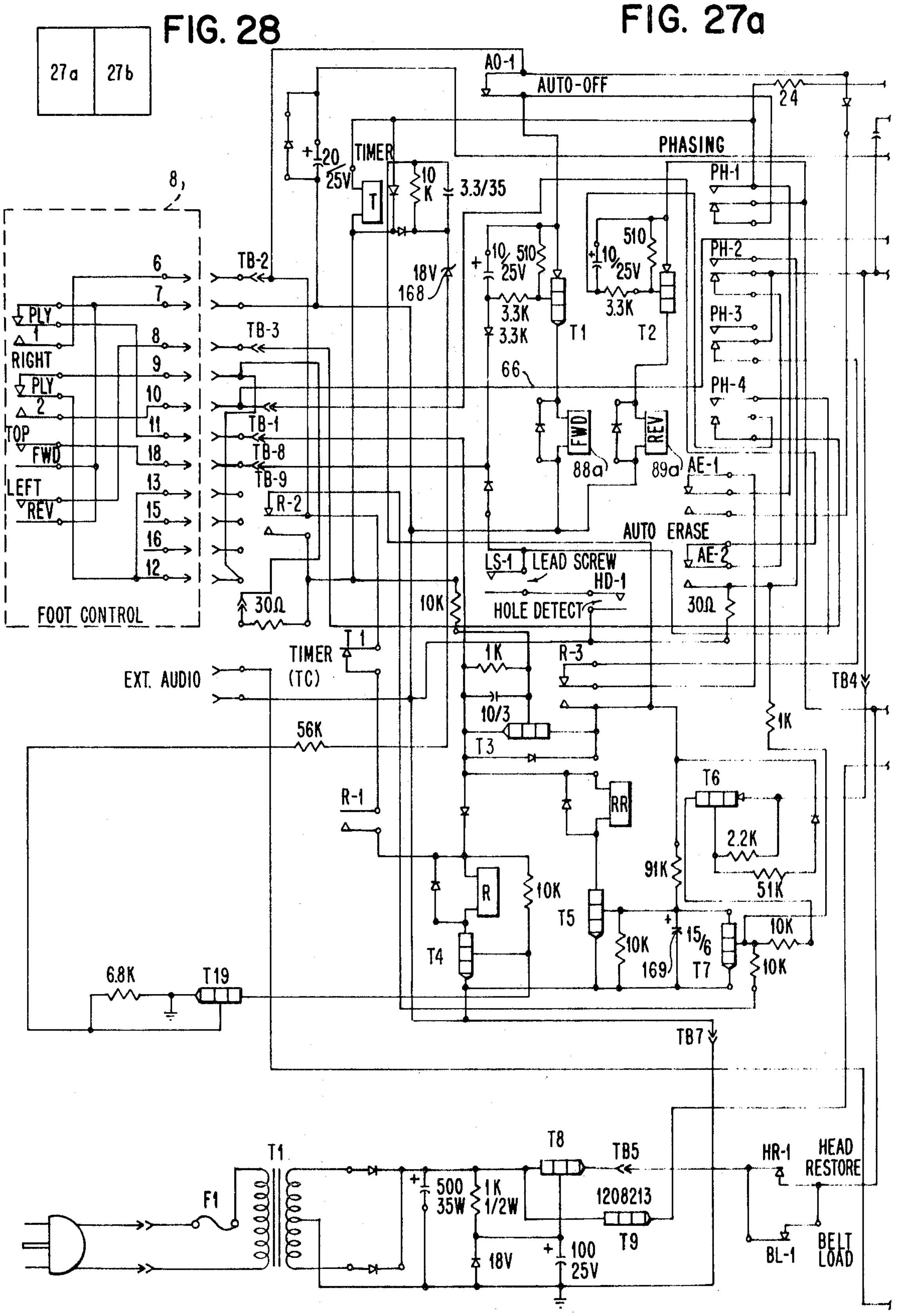
FIGS. 27*a* and 27*b*, when arranged according to FIG. 28, represent circuitry for the transcribing unit of FIG. 15.

In FIG. 27*a*, the R–3 contacts transfer and potential is applied through these contacts, the not automatic erase contacts $\overline{AE-1}$ to the upper part of motor 105*a*. The lower portion of the motor circuit is completed through the Phase 2 contacts, not automatic erase contacts 2 $\overline{AE-2}$, terminal 12 of foot control 8, center strap of playback contact 2, lower strap of this set of contacts, terminal 10 and by line 66 to the motor regulating circuit and speed control circuit including transistors T10–T16, FIG. 27*b*.

Release of foot control 8 will disconnect the circuits just described and with control 19 set to a zero or "No Recall" position, FIG. 15, stops the motor and the playback operation.

MANUAL SCAN OPERATION

Pushing scanning lever 16*a* in toward the machine enables movement of the scanner mechanism and magnetic head to any desired position on index slip 15*a* and with respect to belt 2. The movement of scanning lever 16*a* operates pawl retract bail 87, FIG. 17*a*, to disengage pawl assembly 101 from lead screw 100 and permit easy movement of the sound head in the unit.

FORWARD STEPPING

It is also possible for the operator to reach a desired portion of belt 2 in the forward direction by depressing the top portion of foot control 8. This transfers switch contacts designated forward FWD and provides a connection through terminal 18 to saturate transistor T1 thereby activating the Forward solenoid 88*a*. This renders the escapement mechanism described previously effective to increment the sound head in relation to the magnetic belt by successive increments that is termed a measured review.

Movement of the sound head in transcribing unit 5 in the reverse direction in relation to magnetic belt 2 is effected by depressing the left portion of foot control 8 thereby transferring the reverse switch contacts and completing a circuit through connection 8 to transistor T2 to activate the reverse solenoid 89.

With an option, continued incrementing of the sound head in either the selected forward or reverse directions is repeated continuously by continued depression of the foot control 8 in the required direction.

AUTOMATIC RECALL FEATURE

The transcribing apparatus and the dictating apparatus, if desired, incorporates means for automatically repositioning the sound head in relation to the magnetic belt 2 each time that the foot control is released following a playback operation in order to pick up the last several words of dictation when the equipment is started again. The recall is adjustable by means of the recall lever 19, FIG. 15, anywhere from a no recall condition to approximately five words.

Figure 16:
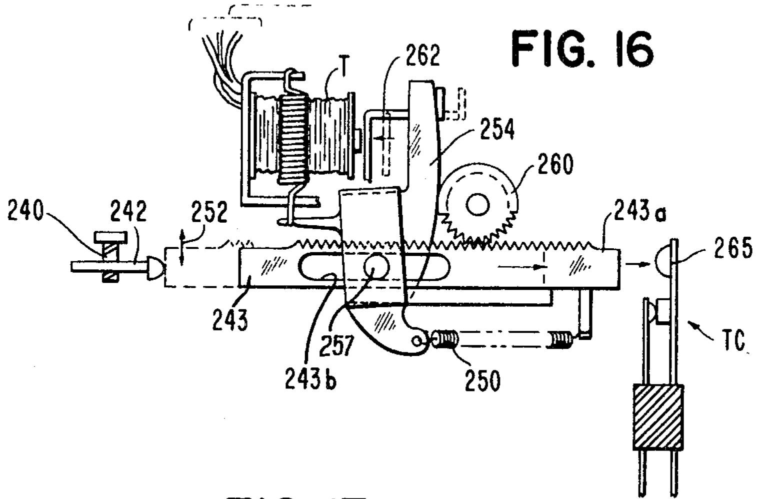
FIG. 16 shows an automatic recall rack and associated components for the transcribing unit of FIG. 15.

The recall feature includes various structures shown particularly in FIGS. 16, 18, and 19 together with electrical circuits in FIG. 27*a*.

The operator adjusts recall lever 19 prior to a transcribing operation, normally, and readjusts as desired during the course of transcribing operations. In FIG. 18, recall lever 19 extends from a block 230 that is slideably mounted for movement to the left and right on guide rods 231 and 232. Extending from block 230 is a pin 234 cooperating with a link 235 mounted for pivotal movement at 236. Connected to link 235 by clevis link 238 is a lever 240 centrally mounted for pivoting at 241. Lever 240 has an adjustable stop 242 arranged for cooperation with a timer rack 243, the latter three items also being shown in FIGS. 16 and 19. Rack 243 is arranged for movement left to right and right to left in the figures with a spring member 250 maintaining rack 243 generally to the left against stop 242. Positioned adjacent extremity 243*a* of rack 243 is a set of timer contacts TC, shown also in the circuit of FIG. 27*a*. Rack 243 is also movable slightly upwardly and downwardly as indicated by arrow 252, FIG. 16, under control of a timer magnet T. This is effected by movement of a timer arm 254 engaging rack 243 in slot 243*b* by pin 256. Rack 243 is positioned adjacent a driving gear 260 for driving from left to right during its operation.

Considering the structural aspects first, rack 243 normally rests against stop 242 and by energization of timer magnet T through armature 262 is moved upwardly under control of arm 254 and pins 256 and 257 into engagement with gear 260. Adjustment of recall lever 19 moves rack 243 closer or further away from contact assembly TC. Contact assembly TC is incorporated in a driving circuit for motor 105*a* to drive the motor and hence the sound head in relation to magnetic belt 2 a varying distance depending upon the time it takes rack 243 to encounter operating strap 265 of the timer contact assembly TC and open contacts TC.

RECALL CIRCUITS AND OPERATION

It is assumed that recall lever 19 is set at a position other than a "No Recall" position which moves stop 242 leftwardly and due to the bias exerted by spring 250 moves rack 243 away from strap 265 of contact assembly TC. Conditions are now established for reversing the direction of drive or rotation of motor 105*a*, thereby reversing the scanning of the sound head in relation to the magnetic belt 2 a desired number of words as determined by the setting of recall lever 19. It is assumed that the transcriber has been operating unit 5 in the playback mode and has accordingly had the right side of foot control 8 depressed to transfer the playback contacts 1 and 2 and supply potential to energize relays R and RR and to supply the operating potential of 16.0 volts, nominal, to the upper portion of motor 105*a* to thereby cause its rotation in the forward direction.

As soon as the transcriber releases foot control 8, the playback switch assemblies SW1 and SW2 return to their normally closed conditions shown in FIG. 27*a*. Not SW1 provides ground to the circuits for relays R and RR which would normally deenergize them. However, relay R continues to hold through its own R–1 contacts and the timer contacts TC. A circuit now exists from the automatic off contacts $\overline{AO}$ through the R–2 contacts, left-center of FIG. 27*a*, now transferred, terminal 9 of foot control 8, playback contacts 2, terminal 12 of foot control 8, automatic erase contacts AE–2, phase 2 PH–2 contacts to the lower circuit connection of motor 105*a*. The upper side of motor 105*a* is connected to ground through the automatic erase contacts $\overline{AE1}$, the R–3 contacts presently closed, transistor T3, connector 11 in foot control 8 and not switch 1 $\overline{SW1}$ by connector 7 to ground. The path through transistor T3 also serves as a ground connection for the upper side of the timer coil 3.

Motor 105*a* now rotates in the reverse direction to drive gear 260 counterclockwise, FIGS. 16 and 19. With the energization of the timer magnet T, rack 243 is moved into engagement with gear 260 by arm 254 due to the connection with stud 257. Motor 105*a* and gear 260 drive rack 243 rapidly toward contact strap 265 of the timer contacts TC. As soon as rack 243 moves sufficiently far enough to operate against contact strap 265 and open the timer contacts TC, relay R becomes deenergized. This transfers all of the R contacts to the not actuated condition. The transfer of contacts R–1 opened the holding circuit to relay R. The opening of contacts R–2 breaks the circuit for the 18.0 volt potential to the lower side of motor 105*a* while the opening of contacts R–3 breaks the ground circuit for both motor 105*a* and timer T. Motor 105*a* ceases operation and timer T deenergizes to allow rack 243 to drop out of engagement with gear 260. Spring 250 restores rack 243 against stop 242 in readiness for another automatic word recall operation.

TERMINATION OF AUTOMATIC RECALL OPERATION PRIOR TO ITS NORMAL COMPLETION

Under some circumstances, the transcriber may wish to continue with the playback operation and not have the automatic recall feature completely operative. The recall operation may be terminated by the transcriber by an immediate further depression of the right side of foot control 8 switch again transfers the playback switch assemblies SW1 and SW2 to the their playback condition. When foot control 8 is operated prior to the completion of the automatic recall operation, timer T still has a large potential tending to keep it energized. This potential is in the range of 36 volts that is available at the Zener diode 168. Zener diode 168 normal drop is about 18 volts but with a 36 volt potential, a circuit is completed to quickly stop the motor through $\overline{AE1}$, $\overline{R3}$, and PH3 that form a short circuit around the motor armature. Also, an 18 volt potential through transistor T6 controls transistor T7 to discharge a capacitor 169 in the base-emitter path of transistor T5 thereby maintaining relay RR deenergized to mute the audio circuits until the structures and circuits have settled down.

From the foregoing description, it is seen that a number of unique structures and circuits combine to establish efficient transcribing operations.

TRANSCRIBER LOGIC

Figure 27B:
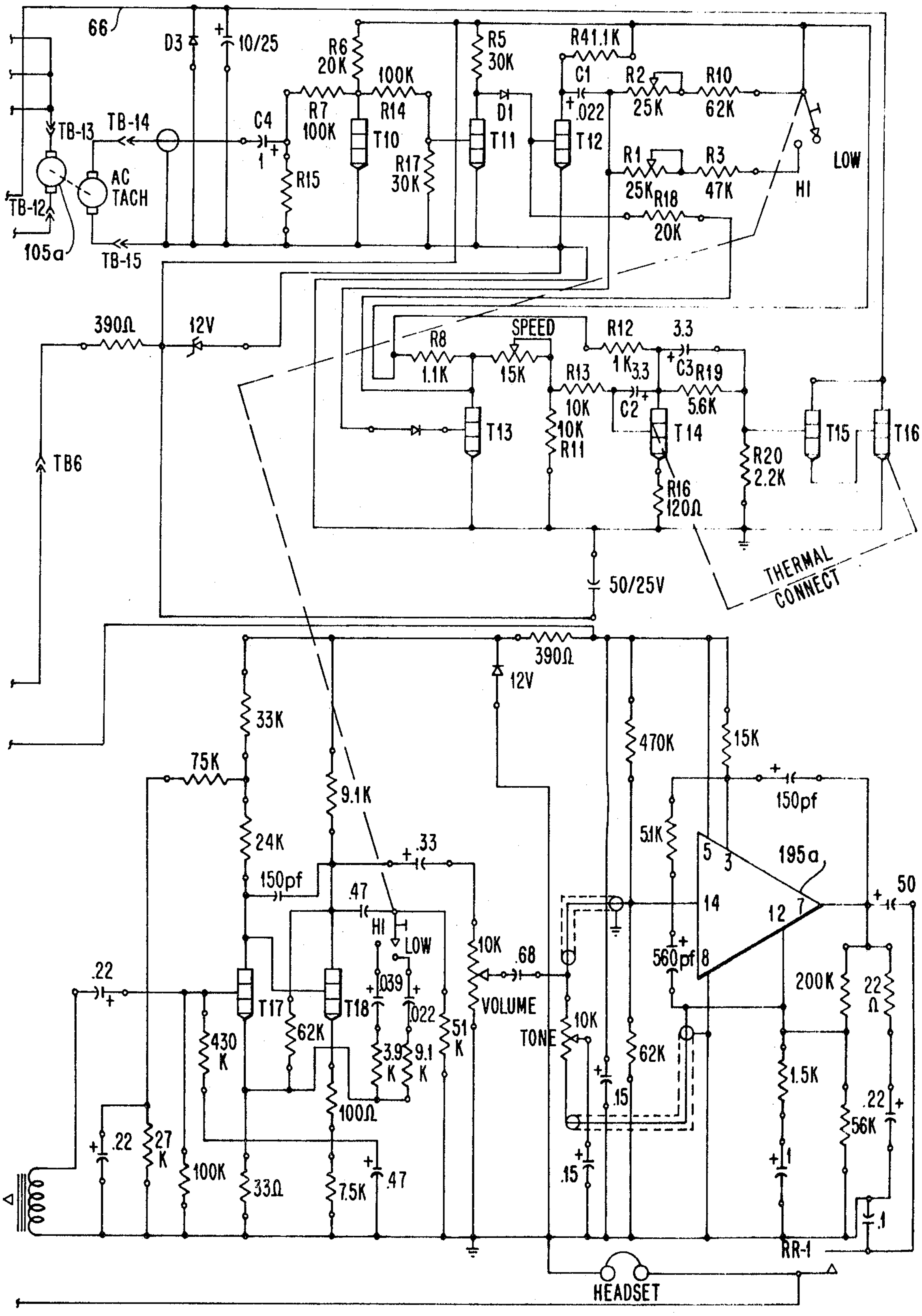
Figure 31:
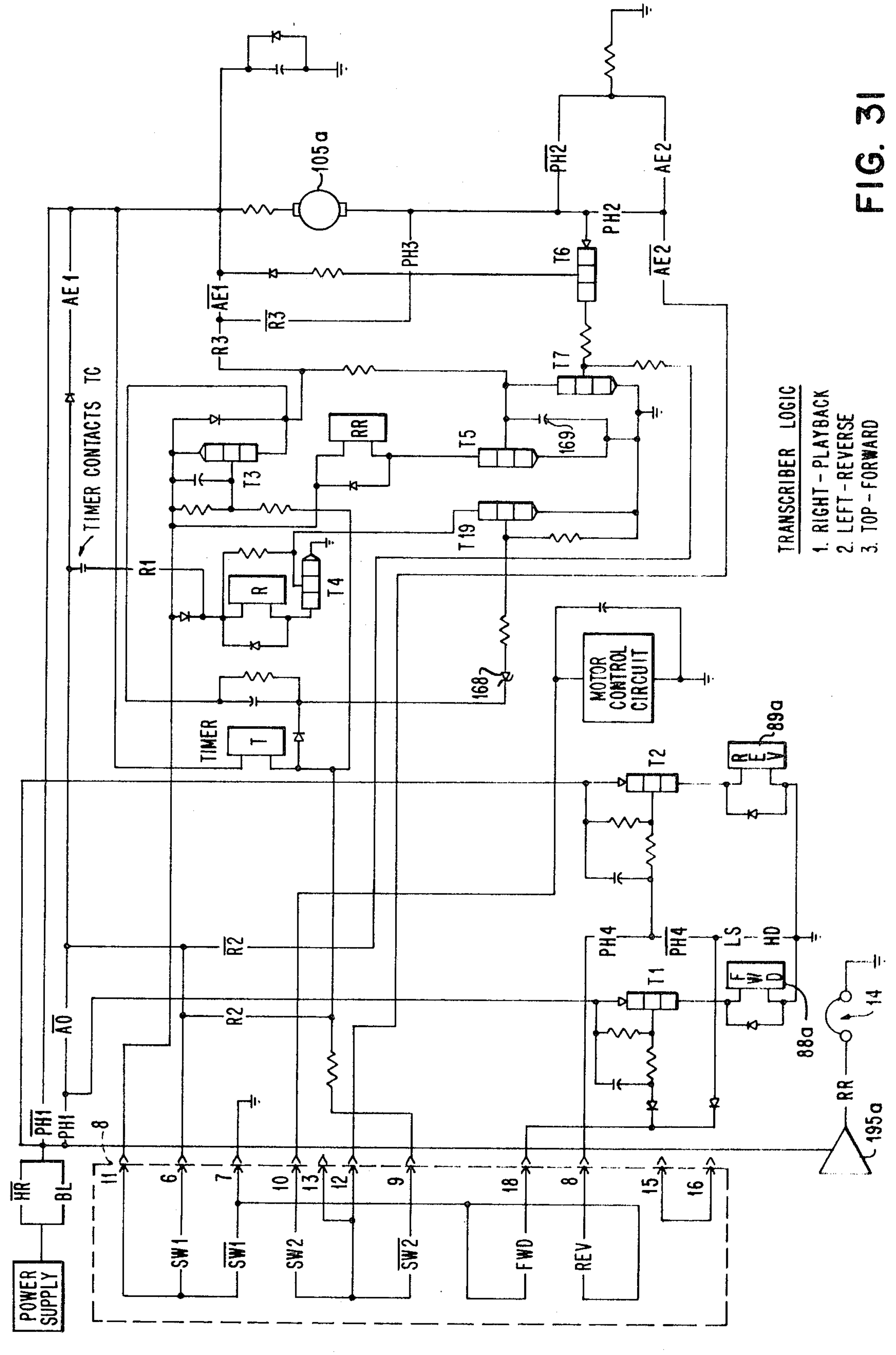
FIG. 31 is a logic diagram for the circuit actions in the transcribing unit of FIG. 15 and with reference to the circuits of FIGS. 27*a* and 27*b*.

FIG. 31 illustrates the logic involved in operation of the transcriber circuits shown in detail in FIGS. 27*a* and 27*b*. The logic is clarified by consideration of a typical transcribing operation. The logic includes the foot control 8 with switch 1 and 2 contacts SW1 and SW2 that are movable by depression of foot control 8 on the right side. The foot control includes forward FWD and reverse REV contacts for operating forward and reverse solenoids 88*a* and 89*a* under control of associated transistors T1 and T2. The logic further includes timer T, timer contacts TC, an R relay and associated transistor T4 controlled by transistor T19, an RR relay controlled by transistor T5 that is in turn selectively controlled by transistors T6 and T7 and motor 105*a* together with a motor control circuit for regulating its speed in a selected speed range.

A typical sequence of operations involves unloading a belt and reloading a new belt to continue transcription. When a belt is ejected from transcribing unit 5, the sound head is usually away from the home margin position as reflected by head restore HR contacts being closed as indicated with the designation not head restore $\overline{HR}$. Such contacts being closed complete a circuit through not phase 1 contacts to drive motor 105*a* for restoring sound head to the initial margin location. When the transcriber inserts a belt into the unit, the belt load BL contacts close to further supply driving power to motor 105*a* through the not phase 1 contacts. This also conditions amplifier stage 195*a* for operation when the RR relay becomes energized later.

Immediately following insertion of a belt in the unit, the lead screw is phased to a zero condition and aperture 2*a* of belt 2 is sensed to establish a desired initial relationship between sound head 82 and belt 2 in the unit. The belt loading and phasing mechanisms are latched with all of the phase contacts in an inactive or logical not condition and retained in such condition until the lead screw is phased and the belt aperture is sensed. The mechanisms are reset upon such occurrence under control of a latch member operated by the reverse solenoid 89*a*. Closure of the lead screw LS contacts indicating a lead screw zero phase condition and the hole detect HD contact complete a circuit to ground for biasing transistor T2 on to energize the reverse solenoid 89*a*, thereby unlatching the phasing mechanisms and indicating that the unit is ready for operation. This moves all of the phase contacts to their phased condition.

To operate the unit, the transcriber depresses foot control 8 on the right side which transfers switch assemblies SW1 and SW2 to supply power to the various circuits of the machine. Power is from the power supply through the belt load BL contacts, phase 1 PH1 contacts, automatic off $\overline{AO}$, terminal 6 of foot control 8, switch 1, and terminal 11 to the upper side of relays R and RR, rendering the latter relays active and transferring the associated contacts. The relay RR contacts complete the amplifier circuits to head set 14. Power is also supplied from terminal 8, R3, and $\overline{AE\text{-}1}$ to the upper side of motor 105*a*. The lower side of the motor circuit is completed through the automatic erase contacts $\overline{AE2}$ through switch SW2, connector 10, to the motor control circuit. Motor 105*a* thereupon operates to drive sound head in unit 5 in relation to magnetic belt 2 in order to trace a helical path on the belt.

During operation, the transcriber may wish to scan the belt forwardly or reversely and does so by appropriate depression of foot control 8. A forward scan is initiated by depression of the top of foot control 8 closing the forward FWD contacts to terminal 18 and driving transistor T1 to energize forward solenoid 88*a*. This operates the escapement pawl assemblies described elsewhere. Scanning of the sound head in a reverse direction with respect to magnetic belt 2 is effected by depression of the left side of foot control 8 which closes the reverse contacts and biases transistor T2 to operate the reverse solenoid 89*a*.

The unit has an automatic recall feature that is controlled by movement of automatic recall lever 19 on the front of the unit through a range from no recall zero to approximately five words of recall. While in a playback mode with switches SW1 and SW2 transferred, the circuits of the equipment are prepared to supply an automatic recall operation upon termination of the playback.

Relay R is held through its own R1 contacts and timer contacts TC that are controlled by the timer rack 243, FIG. 16.

Assuming that the automatic recall lever 19 is set at a position other than the zero position, the operation of the automatic recall feature is as follows. Release of foot control 8 establishes the not switch 1 and not switch 2 conditions $\overline{SW1}$ and $\overline{SW2}$ and reverses connections to motor 105*a* to reverse the direction of driving of motor 105*a* in order to drive belt 2 in a reverse direction in relation to the sound head. Also, this rotates gear 260, FIG. 16, to drive rack 243 toward strap 265 of contact assembly T–1 in order to open contact assembly TC and terminate the recall operation. The extent of recall is determined by the relative location of rack 243 in relation to strap 265 as determined by the setting of stop 242 that is directly controlled by movement of automatic recall lever 19.

The circuit connections for reversing the rotation of motor 105*a* are from power supply, belt load BL contacts, phase 1 PH1, not automatic off $\overline{AO}$, R2 contacts, not switch 2 $\overline{SW2}$, connection 12, not automatic erase contacts $\overline{AE2}$, Phase 2 contacts to the bottom of motor 105*a*. This supplies approximately 18.0 volts on this side of the motor for driving purposes. The opposite side of the motor is grounded through the automatic erase contacts $\overline{AE1}$, , the R3 contacts, transistor T3 connector 11, not switch 1 $\overline{SW1}$, connector 7 to ground. Ground is also applied to the timer coil which through the mechanisms shown in FIG. 16 moves rack 243 into engagement with gear 260. Opening of the timer contacts TC drops relay R and timer T. In this manner a desired amount of recall is automatically obtained in the equipment.

If the operator wishes to terminate the timer operation prior to its normal completion, she again depresses foot control 8 to transfer the playback switch contacts SW1 and SW2 into a playback mode. Such transfer of the SW1 and SW2 contacts opens the circuits for reverse driving of motor 105*a*, terminates the energizing circuit for the timer, and through transistor T19 drops relay R to permit the circuits to settle down. Relay R is then able after a predetermined length of time to become energized again as in a normal playback mode of operation. Transistors T5, T6, and T7 are effective to control the relay RR that in turn controls muting of the audio circuits.

While the invention has been particularly shown and described with reference to several embodiments, it will be understood by those skilled in the art that various changes in form and detail may be made without departing from the spirit and scope of the invention.

What is claimed is:

1. An automatic phasing feature for dictating and transcribing apparatus to establish at least an initial accurate phased condition of a sound head in relation to a signal track on a record media, said media customarily being provided with a phasing indicia in a predetermined location thereon, and said apparatus including media loading means, comprising:

means for relatively driving said sound head and said record media to trace a signal path on said record media;

first indicating means for indicating a predetermined zero phased condition of said sound head driving means;

second indicating means for sensing said phasing indicia on said record media and for indicating a predetermined zero phased condition of said record media;

motive means arranged for driving interconnection with said sound head and record media driving means;

operational means in said apparatus operable in a normal mode to initiate at least one type of operation in said apparatus after termination of the phasing operation;

latch means included in said operational means, said latch means being normally set in an unlatched condition but settable to a latched condition during the latter portion of the phasing operation until the phasing operation has been completed and said latch means providing at least an output indicative of a latched condition;

interconnect means automatically operative to interconnect said motive means to drive said sound head and said record media at least upon initial insertion of said record media in said apparatus;

means in said interconnect means responsive to an output from said latch means when said latch means is set to a latched condition to disconnect said motive means from said sound head or said record media, as required;

phase termination control means for unlatching said latch means, said phase termination control means comprising first and second portions each of said portions being settable between nontermination and termination states, said first portion being set to a termination state by movement of said latch means to a latched condition, said portions being interconnected in such a manner that both portions are required to be set to a termination state in order for said phase termination control means to unlatch said latch means;

first recognition means controlled by said indicating means and arranged to recognize a phased condition of either said sound head or said record media and thereupon operable to set said latch means to control said interconnect means to disconnect the driving interconnection from said motive means to the associated sound head driving means or record media driving means, as the case may be;

means responsive to an output from said latch means when said latch means is set in a latched condition to set the first portion of said phase termination control means to indicate a zero phase condition of said sound head driving means or said record media driving means, as the case may be;

and second recognition means controlled by said indicating means and arranged to recognize a phased condition of the other of said sound head or record media not previously phased and for terminating the phasing operation by setting said second portion of said phase termination control means thereby establishing a set state of both said first and second portions of said phase termination control means to thereupon unlatch said latch means and control said interconnect means to disconnect the driving interconnection from said motive means to the related one of said sound head driving means and said record media driving means not previously disconnected.

2. The apparatus of claim 1, further comprising:

means for terminating said phasing operation at any time following setting of said latch means insertion of a record media and irrespective of the phased condition of the sound head and media.

3. The apparatus of claim 1, further comprising;

media loading means for receiving and guiding a record media into said apparatus; and means controlled by said media loading means to initiate operation of said interconnect means upon completion of a media loading operation.

4. The apparatus of claim 3, further comprising:

electronic circuitry in said apparatus;

a set of contacts in said circuitry, said contacts being movable to a phased condition for activating said circuitry to enable use of said apparatus and to a not Phased condition for deactivating said circuitry;

and means controlled by said media loading means upon completion of a media loading operation for moving said contacts to a not phased condition and further controlled by said phase termination control means upon termination of a phasing operation for moving said contacts to a phased condition.

5. The apparatus of claim 1, further comprising:

interlock means settable to an activating state for activating mechanisms and circuits in said apparatus to enable use thereof and settable to a deactivating state to deactivate said mechanisms and circuits to prevent use thereof;

means controlled by said media loading means upon media insertion in said apparatus for deactivating said interlock means and further controlled by said termination control means upon termination of the phasing operation for activating said interlock means.

6. The apparatus of claim 5, wherein:

said deactivated mechanisms include said sound head and an incrementing means for connecting said sound head to its driving means.

7. An automatic phasing feature for dictating and transcribing apparatus to establish at least an initial accurate phased condition of a sound head in relation to a signal track on a record media, said media customarily being provided with a phasing indicia in a predetermined location thereon, said apparatus including media loading means, comprising:

means for relatively driving said sound head and said record media to trace a signal path on said record media;

first means for indicating a predetermined zero phased condition of said sound head driving means;

second means for sensing said phasing indicia on said record media and for indicating a predetermined zero phased condition of said record media;

motive means arranged for driving interconnection with said sound head and record media driving means;

control means automatically operative to interconnect said motive means to drive said sound head and said record media at least upon initial insertion of said record media in said apparatus;

recognition means associated with said control means and controlled by the first received phase indication from either said sound head or said record media for disconnecting the driving interconnection from said motive means to the associated sound head driving means or record media driving means, as the case may be, and further controlled by phase indications from both said indicating means for terminating the phasing operation by disconnecting the driving interconnection from said motive means to the related one of said sound head driving means and said record media driving means not previously disconnected;

means for relatively incrementing said sound head and media by measured steps in a selected direction;

interlock means settable to an activating state for activating mechanisms and circuits in said apparatus to enable use thereof and settable to a deactivating state to deactivate said mechanisms and circuits to prevent use thereof;

latch means associated with said interlock means, said latch means being settable to a latched state and to an unlatched state and operable in a latched state to retain said interlock means deactivated and in an unlatched state to activate said interlock means;

means controlled by said media loading means upon media insertion in said apparatus for setting said latch means to set said interlock means to deactivate said interlock means during a phasing condition and further controlled by said recognition means upon termination of the phasing operation to activate said incrementing means; and means controlled by said incrementing means to set said latch means to an unlatched state to set said interlock means to an activating state when phasing is terminated.

8. The apparatus of claim 7, further comprising:

a reverse incrementing means in said incrementing means and an associated solenoid operable to set said latch means to an unlatched state to activate said interlock means.

9. The apparatus of claim 8, further comprising:

means positioned for manual control by an operator to initiate operation of said solenoid and reverse incrementing means to unlatch said interlock means irrespective of the phased condition of the sound head and media.

second means for sensing said phasing indicia on said record media and for indicating a predetermined zero phased condition of said record media;

motive means arranged for driving interconnection with said respective sound head and record media driving means;

control means automatically operative to interconnect said motive means to drive said sound head and said record media at least upon initial insertion of said record media in said apparatus;

and recognition means associated with said control means and controlled by a phased indication from said first indicating means for disconnecting the driving interconnection to the associated sound head and further controlled by a phase indication from said second indicating means for disconnecting the driving interconnection to said record media and terminating the phasing operation.

10. An automatic phasing feature for dictating and transcribing apparatus to establish at least an initial accurate phased condition of a sound head in relation to a signal track on a record media, said media customarily being provided with a phasing indicia in a predetermined location thereon, comprising:

means for relatively driving said sound head and said record media to trace a signal path on said record media;

first indicating means for indicating a predetermined zero phased condition of said sound head driving means;

second indicating means for sensing said phasing indicia on said record media and for indicating a predetermined zero phased condition of said record media;

motive means arranged for driving interconnection with said sound head and record media driving means;

operational means in said apparatus operable in a normal mode to initiate at least one type of operation in said apparatus after termination of the phasing operation;

latch means included in said operational means, said latch means being normally set in an unlatched condition but settable to a latched condition during the latter portion of the phasing operation until the phasing operation has been completed and said latch means providing at least an output indicative of a latched condition;

interconnect means automatically operative to interconnect said motive means to drive said sound head and said record media at least upon initial insertion of said record media in said apparatus means in said interconnect means responsive to an output from said latch means when said latch means is set to a latched condition to disconnect said motive means from said sound head, as required:

phase termination control means for unlatching said latch means, said phase termination control means comprising first and second portions, each of said portions being settable between nontermination and termination states, said first portion being set to a termination state by movement of said latch means to a latching condition, said portions being interconnected in such a manner that both portions are required to be set to a termination state in order for said phase termination control means to unlatch said latch means;

first recognition means controlled by said indicating means and arranged to recognize a phased condition of either said sound head or said record media and thereupon operable to set said latch means to control said interconnect means to disconnect the driving interconnection from said motive means to said sound head driving means;

means responsive to an output from said latch means when said latch means is set in a latched condition to set the first portion of said phase termination control means to indicate a zero phased condition of said sound head driving means;

and second recognition means controlled by said indicating means and arranged to recognize a phased condition of said record media and for terminating the phasing operation by setting said second portion of said phase termination control means thereby establishing a set state of both said first and second portions of said phase termination control means to thereupon unlatch said latch means and disconnect the driving interconnection from said motive means to said record media driving means.

11. The apparatus of claim 10, wherein:

said record media includes a sensible indicia to indicate a predetermined zero phased condition; and wherein said second indicating means supplies an indication responsive to sensing of said indicia.

12. The apparatus of claim 10, further comprising:

a lead screw and a clutch in said sound head driving means; and means for interconnecting said lead screw to said motive means by engaging said clutch and for disconnecting said lead screw from said motive means when said lead screw reaches a zero phased condition.

13. The apparatus of claim 12, further comprising:

a set of lead screw contacts; and a zero phase cam associated with said lead screw for operating said contacts upon said lead screw reaching a zero condition.

14. The apparatus of claim 10, wherein said phase termination control means comprises an electrical circuit for unlatching said latch means, and further comprising:

individual sets of contacts in each of said first and second portions of said phase termination control means for completing said electrical circuit;

means controlled by said first recognition means for operating said first portion contacts; and means controlled by said second recognition means for operating said second portion contacts upon sensing of indicia on a record media indicative of a zero phase location on said media.

15. The apparatus of claim 14, wherein:

said indicia is a preformed aperture in a media at a predetermined zero phase location.

16. An automatic phasing feature for dictating and transcribing apparatus to establish at least an initial accurate phased condition of a sound head in relation to a signal track on a record media, said media customarily being provided with a phasing indicia in a predetermined location thereon, comprising:

means for relatively driving said sound head and said record media to trace a signal path on said record media;

operational means in said apparatus operable in a normal mode to initiate at least one type of operation in said apparatus after termination of the phasing operation;

latch means included in said operational means, said latch means being normally set in an unlatched condition but settable to a latched condition during the latter portion of the phasing operation until the phasing operation has been completed and said latch means providing at least an output indicative of a latched condition;

motive means arranged for driving interconnection with said sound head and record media driving means;

means in said motive means responsive to an output from said latch means when it is set to a latched condition to disconnect said motive means and thereupon discontinue driving of said sound head or said record media, as required;

first recognition means arranged to recognize a phased condition of either said sound head or said record media and thereupon operable to set said latch means to thereby disconnect said motive means from the associated sound head driving means or record media driving means, as the case may be;

second recognition means arranged to recognize and provide an indication of a phased condition of the other of said sound head or record media not previously phased;

and phase termination control means for unlatching said latch means and terminating the phasing operation by disconnecting the driving interconnection from said motive means to the related one of said sound head driving means and said record media driving means not previously disconnected, said phase termination control means comprising first and second portions, said portions being interconnected in such a manner that both portions are required to be set to a termination state in order for said phase termination control means to unlatch said latch means;

means responsive to an output from said latch means when said latch means is set to a latched condition for setting said first portion of said phase termination control means to a termination state; and means responsive to an indication from said second recognition means for setting said second portion of said phase termination control means.

* * * * *